US006545375B2

(12) United States Patent
Hollis, Jr.

(10) Patent No.: US 6,545,375 B2
(45) Date of Patent: Apr. 8, 2003

(54) FIELD-JOINABLE PLATEN TILES FOR PLANAR MOTORS

(75) Inventor: Ralph L. Hollis, Jr., 215 Springhouse La., Pittsburgh, PA (US) 15238

(73) Assignee: Ralph L. Hollis, Jr., Pittsburgh, PA (US)

( * ) Notice: Subject to any disclaimer, the term of this patent is extended or adjusted under 35 U.S.C. 154(b) by 61 days.

(21) Appl. No.: 09/789,374

(22) Filed: Feb. 20, 2001

(65) Prior Publication Data

US 2002/0113496 A1 Aug. 22, 2002

(51) Int. Cl.⁷ .............................................. H02K 41/00
(52) U.S. Cl. ........................................................ 310/12
(58) Field of Search ............................. 310/12, 13, 14, 310/42, 216; 29/596

(56) References Cited

U.S. PATENT DOCUMENTS

| | | | |
|---|---|---|---|
| 3,376,578 A | 4/1968 | Sawyer | 346/29 |
| 3,735,231 A | 5/1973 | Sawyer | 318/687 |
| 4,535,260 A | 8/1985 | Pritchard et al. | 310/12 |
| 4,835,424 A | 5/1989 | Hoffman et al. | 310/12 |
| 5,352,946 A | 10/1994 | Hoffman et al. | 310/12 |
| 5,757,091 A * | 5/1998 | Sogabe et al. | 310/12 |
| 5,777,402 A | 7/1998 | Chitayat | 310/12 |
| 5,828,142 A | 10/1998 | Simpson | 310/12 |
| 5,886,432 A | 3/1999 | Markle | 310/12 |
| 5,887,334 A | 3/1999 | Dooris et al. | 29/596 |
| 5,965,962 A | 10/1999 | Hinds | 310/12 |
| 6,005,309 A | 12/1999 | Chitayat | 310/12 |
| 6,016,021 A | 1/2000 | Hinds | 310/12 |
| 6,104,269 A | 8/2000 | Chitayat | 335/286 |
| 6,175,169 B1 | 1/2001 | Hollis, Jr. et al. | 310/12 |
| 6,184,596 B1 * | 2/2001 | Ohzeki | 310/12 |

FOREIGN PATENT DOCUMENTS

GB        2 189 085 A    * 10/1987

* cited by examiner

Primary Examiner—Tran Nguyen
Assistant Examiner—Judson H. Jones

(57) ABSTRACT

The invention discloses a modular rectangular stator or platen for planar motors (sometimes referred to as planar linear motors) which is in light weight tile form, permitting multiple platens to be temporarily joined together in an ensemble to provide a continuous stator for a plurality of planar motors operating thereon. Provision is made for the array of operative features of the platen tiles to be strictly parallel to the platen tile edges and for the rows of operative features to be strictly positioned with respect to the platen tile edges, thereby permitting a continuous, unbroken pattern of operative features across the interface crack between conjoined tiles. Provision is made for supporting and adjusting the height of tiles above the floor, as well as their levelness, by a plurality of precision height adjusters preferably using a differential mechanism. Further provision is made for mechanically clamping together mating tiles at their edges with first and second precision reference surfaces, ensuring co-planarity of platen tile operative surfaces and lateral alignment of platen tile edges. Still further provision is made for joining three platen tiles together at their corners, permitting large ensembles with L- and T-junctions. The invention of field-joinable platen tiles for planar motors allows the creation of flexible precision motion systems of arbitrary extent incorporating multiple planar motors which can cross from tile to tile over the interface cracks between tiles.

14 Claims, 23 Drawing Sheets

FIELD-JOINABLE PLATEN TILES FOR PLANAR MOTORS

This invention was made with support from the United States Government under Grant Number DMI9527190 awarded by the National Science Foundation. The United States Government has certain rights in the invention.

BACKGROUND

1. Field of the Invention

The present invention relates generally to linear electric motors, and more particularly, to stators, called platens, for linear motors operating in the plane.

2. Description of Prior Art

Linear motors operating in the plane, sometimes referred to as planar linear motors and hereafter referred to as planar motors, are able to rapidly and precisely move within a plane of motion, as opposed to simpler linear motors which are capable of moving only in a straight line. Planar motors operate on a planar stator element referred to as a platen. A feature is that multiple planar motors can operate together on a single platen. Planar motors can trace straight line paths in any direction on the platen, or can move in curved paths, e.g., in a circle. As is well known, these attributes can make the planar motor an essential part of very versatile motion systems. Such systems have many applications, especially in manufacturing. Several companies currently market manufacturing systems based on planar motors.

A popular type of planar motor (U.S. Pat. No. 3,376,578 to Sawyer) provides linear motion in two orthogonal directions in the plane as well as small rotations in the plane. Such a planar motor generally combines four linear-motor sections into a single housing and is capable of producing forces and torques in the plane. The planar motor is magnetically attracted to a patterned iron platen surface while being forced away from the surface by an air bearing film; the equilibrium separation being typically 10 to 15 $\mu$m. The motor sections have fine teeth (typically 0.02 in. wide on a 0.04 in. pitch) and the platen has a two-dimensional array of square teeth of corresponding width and pitch. After chemical or physical machining, the platen surface is planarized using epoxy to form the air-bearing operational surface. The planar motor rides above the platen surface in operative juxtaposition, or, if the platen is inverted, hangs below the platen surface in operative juxtaposition.

Another type of planar motor (U.S. Pat. No. 6,175,169 to Hollis et al.) is of a closed-loop type incorporating an AC-magnetic position sensor, offering advantages of higher speeds and accelerations, greater precision, and the ability to reject mechanical disturbances.

Yet another type of planar motor (U.S. Pat. Nos. 5,777,402, 6,005,309, and 6,104,269 to Chitayat) has a housing containing energized coils. This type of planar motor operates over a platen containing a plurality of permanent magnets embedded in its operational surface. As in the previous type of planar motor, an air bearing separates the planar motor from its platen surface. The roles of platen and motor can be reversed, i.e., the platen can contain an array of coils and the motor can contain only permanent magnets. This arrangement trades the complexity of electrically sequencing a large number of platen coils for the simplicity of a motor needing no electrical connections.

For the aforementioned types of planar motors, platens are made in various sizes to fit intended applications. For example, a popular size platen is 37 in×52 in., but smaller and larger sizes exist. A great difficulty is that the correct size must be chosen carefully before the application is carried out. Generally, the platens are expensive items. If a platen size turns out to be too small, e.g., restricting the motion of multiple planar motors operating over its surface, it must be discarded in favor of a larger one. On the other hand, if a platen is made much larger than necessary, money is wasted.

Larger platens are sometimes fabricated by permanently joining together smaller platens during the manufacturing process. Misalignment of critical operational features such as the aforementioned fine teeth often occurs at the interface crack between these smaller platens. For linear motors, U.S. Pat. No. 5,887,334 to Dooris, et al. teaches a method of splicing together sections of linear motor platens to produce longer platens. Unfortunately, this method cannot apply to planar motor platens.

What is needed is way to make platens for planar motors in tile form to enable their joining and unjoining in the field by the end user of such planar motors to produce platen ensembles of various sizes and topologies to fit the application. The prior art fails to address this need.

OBJECTS AND ADVANTAGES

Accordingly, several objects and advantages of the present invention are:

Precision platen tiles for planar motors with features including:

(a) rectangular platen tiles of substantial rigidity with operational surfaces of substantial planarity comprising stators for multiple planar motors operating thereon;

(b) rectangular platen tiles whose operational features, e.g., ferromagnetic teeth, permanent magnets, or electrical coils, are precisely aligned with respect to the edges of the rectangular tiles;

(c) rectangular platen tiles of operational feature periodicity $\lambda$ with edges located precisely $\lambda/2$ from these features, permitting unbroken continuity of features when two or more platen tiles are joined together;

(d) rectangular platen tiles incorporating a surrounding structural frame therein of substantial strength permitting large clamping loads to be applied without appreciable deflection of the platen tiles' operational surfaces;

(e) precision height adjustment mechanisms for precisely setting the height and levelness of platen tiles;

(f) clamping mechanisms incorporating a first precision reference surface ensuring that the operational surface of two mating platen tile surfaces are accurately aligned regardless of the thickness of the two platens, and a second precision reference surface ensuring that the edges of two mating platen tiles are accurately aligned;

(g) clamping mechanisms incorporating a first precision reference surface ensuring that the operational surface of three mating platen tile surfaces are accurately aligned at a common corner regardless of the thickness of the three platens, and second and third precision reference surfaces ensuring that the edges of three mating platen tiles are accurately aligned; and (h) magnetic or non-magnetic polymer filler to bridge unavoidable small gaps in the interface crack between adjacent platen tiles.

The features (a-h) taken together, permit large areas of platen to be swiftly assembled in the field by semi-skilled workers using a few simple tools. Further, the ensemble of light weight platen tiles can be deployed with various topologies which include L- and T-shaped configurations, according to the needs of the application. A collection of planar motors can travel over the operational surfaces of the ensemble, freely crossing the interface crack between tiles. The configuration of tiles can be easily modified in the field as conditions warrant. When the application is completed, the ensemble can be swiftly dissassembled into its component parts and re-used for a different application. Thus the invention of field-joinable platen tiles permit the designer of a small, medium, or large motion system based on planar motors a degree of flexibility hitherto unobtainable. There is a tremendous need for such flexible motion systems in a broad sector of manufacturing industries.

Further objects and advantages of the invention will become apparent from a consideration of the drawings and ensuing description.

SUMMARY OF THE INVENTION

A precision field-joinable platen tile which may be combined with other like tiles to provide an unbroken, continuous operational platen surface or stator upon which multiple planar motors can freely operate.

A set of provisions for supporting, leveling, aligning, and joining the above described platen tiles.

BRIEF DESCRIPTION OF THE DRAWINGS

The features of the invention believed to be novel and the elements characteristic of the invention are set forth with particularity in the appended claims. The invention itself, however, both as to organization and method of operation, may best be understood by reference to the detailed description which follows taken in conjunction with the accompanying drawings in which:

DETAILED DESCRIPTION OF THE PREFERRED EMBODIMENT—FIGS. 1–6B, 8–9C, 11A–13

Figure 1:
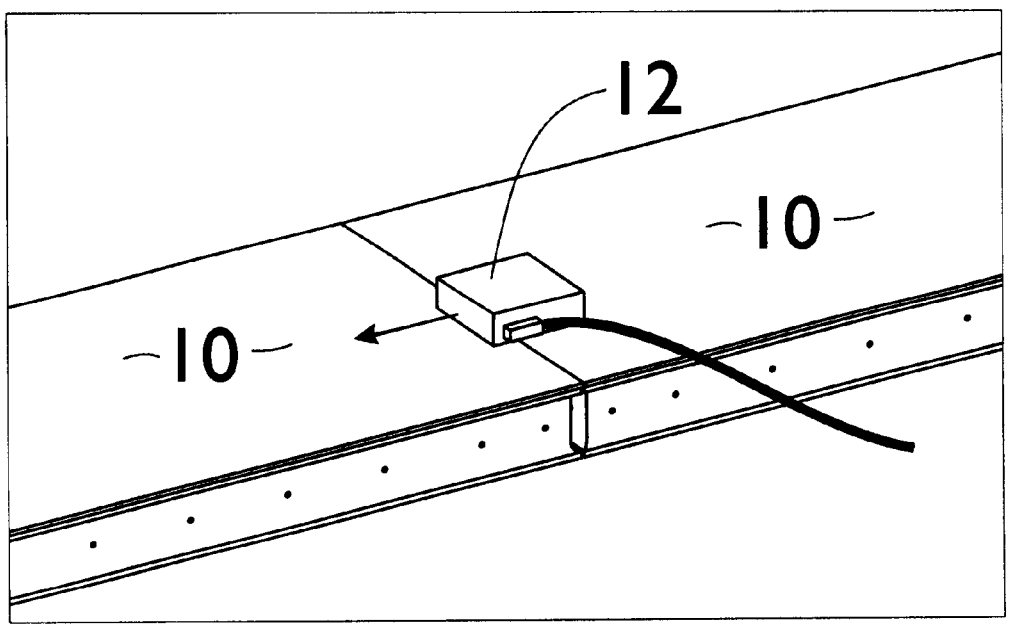
FIG. 1 shows a pair of field-joinable platen tiles with a planar motor travelling over the interface crack between the tiles.

Referring to FIG. 1, there is an overall view showing a pair of rectangular field-joinable platen tiles 10 which are aligned and joined together. Their top surfaces are (to substantially high precision) at the same height and are also (to substantially high precision) coplanar. Their side edges are also aligned (to substantially high precision) with each other. Also shown in the figure is a planar motor 12 (sometimes referred to as a planar linear motor) supported on a thin air bearing film (not shown) travelling to the left over the junction formed between the platen tiles. (In this figure, means for supporting, aligning, and joining the platen tiles are omitted for clarity.)

Figure 2A:
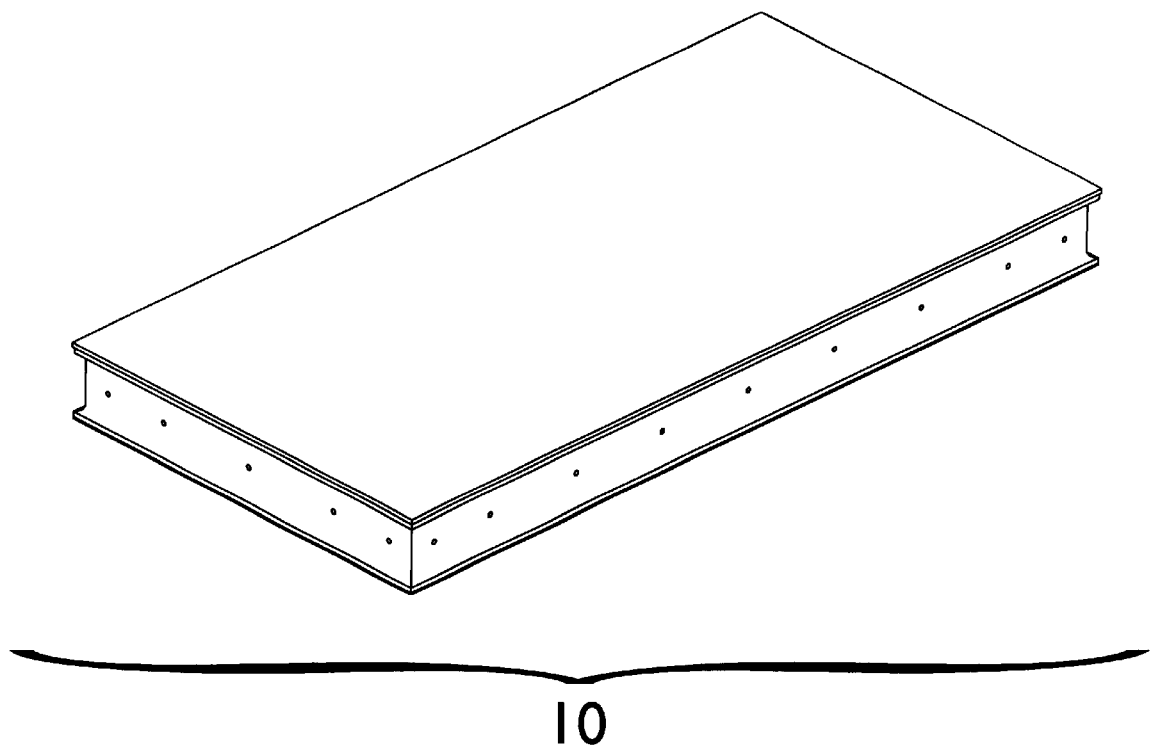
FIG. 2A is an overall view of a field-joinable platen tile.

FIG. 2A shows rectangular platen tile 10 of arbitrary size. (In a preferred embodiment such tiles measure 1200 mm×600 mm, with thickness of approximately 100 mm.) The construction of tile 10 is made evident by FIG. 2B, which is an exploded view of FIG. 2A, showing top sheet 26, honeycomb core 28, bottom sheet 29, and surround frame 30. As shown by dashed arrows, the top of honeycomb core 28 is permanently bonded to the bottom side of top sheet 26, and the top side of bottom sheet 29 is permanently bonded to the bottom of honeycomb core 28. The bottom of top sheet 26 is, in turn, permanently bonded around its edges to the top of surround frame 30. Platen surround frame 30 is shown as an I-beam, but its section can take other forms consistent with strength and lightness.

Figure 3:
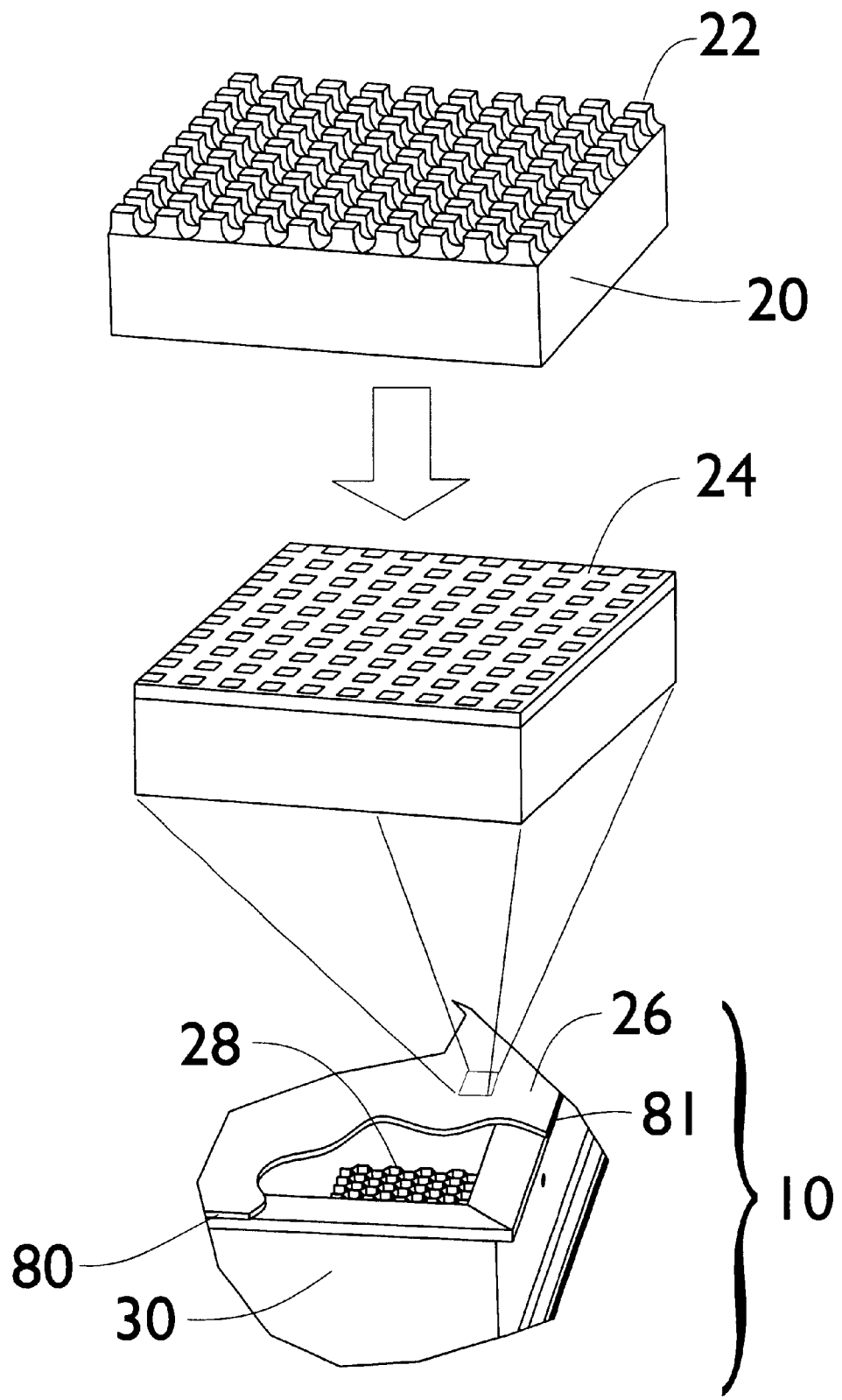
FIG. 3 shows fine details of the surface of the field-joinable platen tile.

FIG. 3 details a highly-magnified area of top surface 26 of platen tile 10. A regular array of square teeth 22 with rounded roots is formed in surface 26 by any number of techniques including machining, photochemical etching, embossing, and the like well known in the art. Spaces between the teeth 22 are backfilled with another material 24 to form the flat surface of 26. In a preferred embodiment, teeth 22 have dimensions of 0.5 mm×0.5 mm, spaced on an array of pitch $\lambda=1.0$ mm×1.0 mm, with the array strictly aligned with mating edge 80 and side edge 81 of platen top surface 26. Additionally, there is a half tooth-pitch space $\lambda/2$ between mating edge 80 and the array of teeth 22 as well as a half tooth-pitch space $\lambda/2$ between side edge 81 and the array of teeth 22 (See FIG. 8 for a view of teeth 22 location with respect to edges 80 and 81 of platen top surface 26).

Figure 4:
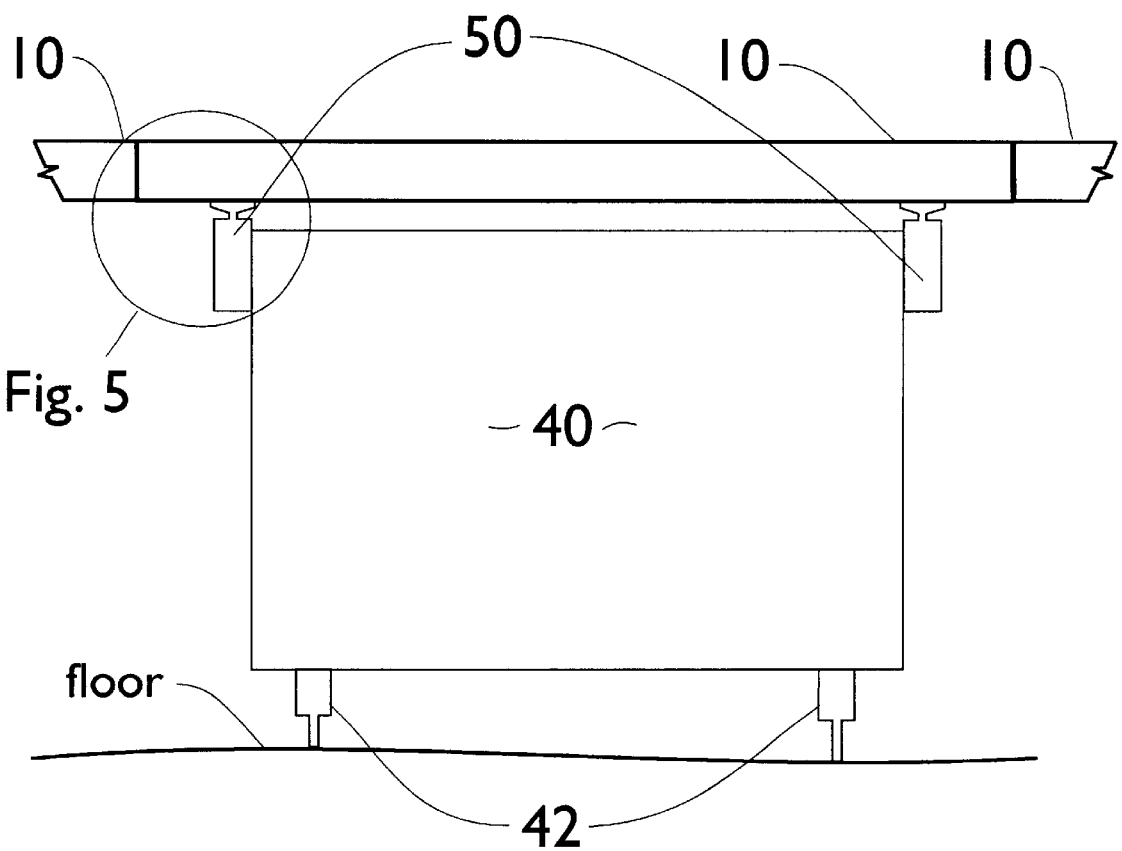
FIG. 4 shows a field-joinable platen tile supported above the floor.

FIG. 4 shows field-joinable platen tile 10 supported by at least three (two are shown) precision height adjustment mechanisms 50 attached to support base 40 providing support at a convenient height above the floor. Support base 40 has itself at least three coarse height adjustment mechanisms 42. (Also shown in FIG. 4 are parts of left and right mating field-joinable platen tiles 10 for reference, with support, alignment, and joining means omitted for clarity.)

Figure 5:
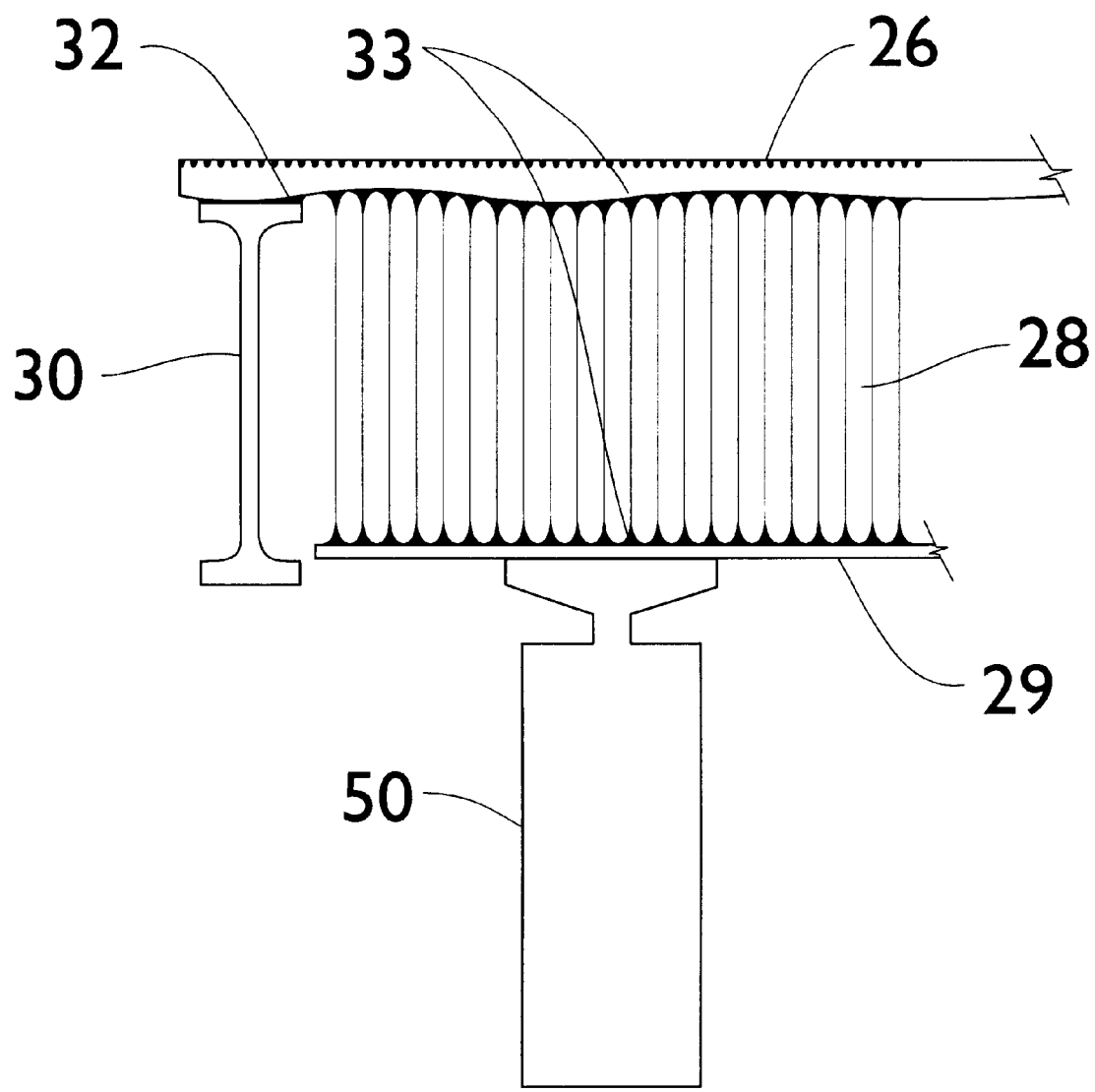
FIG. 5 shows a cross section of one end of a field-joinable platen tile supported by a precision height adjustment mechanism.

Referring to FIG. 5, a cross-sectional view of one end of platen 10 is shown supported by (schematically shown) precision height adjustment mechanism 50. Platen top sheet 26 is shown to emphasize flatness on the upper (top) side of the sheet and possible lack of flatness on the under (bottom) side of 26. Frame 30 is recessed slightly from edge 80 and permanently bonded to the underside of platen top sheet 26 by gap-filling adhesive 32. Honeycomb 28 is permanently bonded to the lower surface of top sheet 26 and the upper surface of platen bottom sheet 29 with adhesive 33.

Figure 6A:
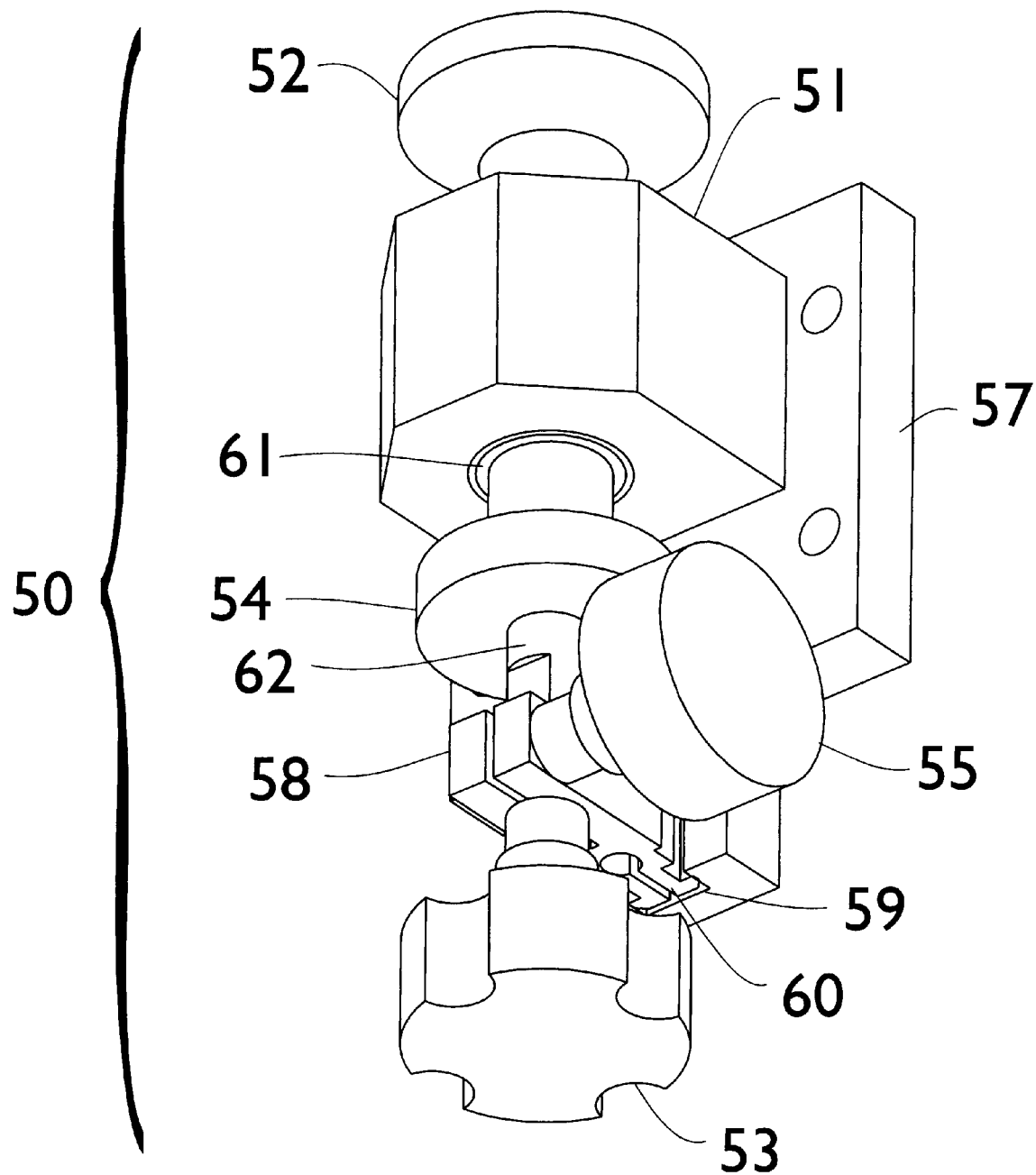
FIG. 6A shows details of a precision height adjustment mechanism.

Platen tile 10 is supported by three or more precision height adjusting mechanisms 50 shown in FIG. 6A. Mounting plate 57 attaches to base 40 shown in FIG. 4. Internally screw-threaded housing 51, in turn, is attached to mounting plate 57. Fine height adjustment knob 54, with external threads 61 is screwed into housing 51. Fine adjusting knob 54, in turn, has a coaxial hole with internal threads to accept coarse adjustment screw 62. Coarse adjustment screw 62 passes through a hole in split clamp body 58 and attaches at its lower end to coarse height adjustment knob 53. The upper end of coarse adjustment screw 62 attaches to swivel pad 52. Split clamp body 58 incorporates split tang feature 60 inserted with substantial tightness in slot 59 formed in the lower part of mounting plate 57. Locking knob 55, incorporating external screw threads engages internal threads (not shown) in split clamp body 58. The arrangement of parts in precision height adjusting mechanism 50 is made clear by the cross-sectional view shown in FIG. 6B. Here, it is seen that swivel pad 52 is free to rotate or swivel owing to its internal ball feature 56 attached to coarse adjustment screw 62 at its upper end. Coarse adjustment screw 62 passes through the internally-threaded central hole of fine adjustment screw 61, and has an unthreaded lower portion which passes though split tang clamp 58 and connects at its lower end to coarse adjustment knob 53. Fine adjustment knob 54 has an upper externally-threaded portion which is screwed into housing 51 which, in turn, is rigidly affixed to mounting plate 57. Clamp 58 has split tang feature 60 inserted in slot 59 in mounting plate 57. The screw thread pitch of coarse adjustment screw 62 and internal screw threads of fine adjusting knob 54 differ from those of the external screw pitch of fine adjusting knob 54 and the internal screw threads of housing 51. For example, the pitch of coarse adjustment screw 62 could be 13 threads per inch, whereas the pitch of the external threads of fine adjustment knob 54 could be 12 threads per inch.

Figure 9A:
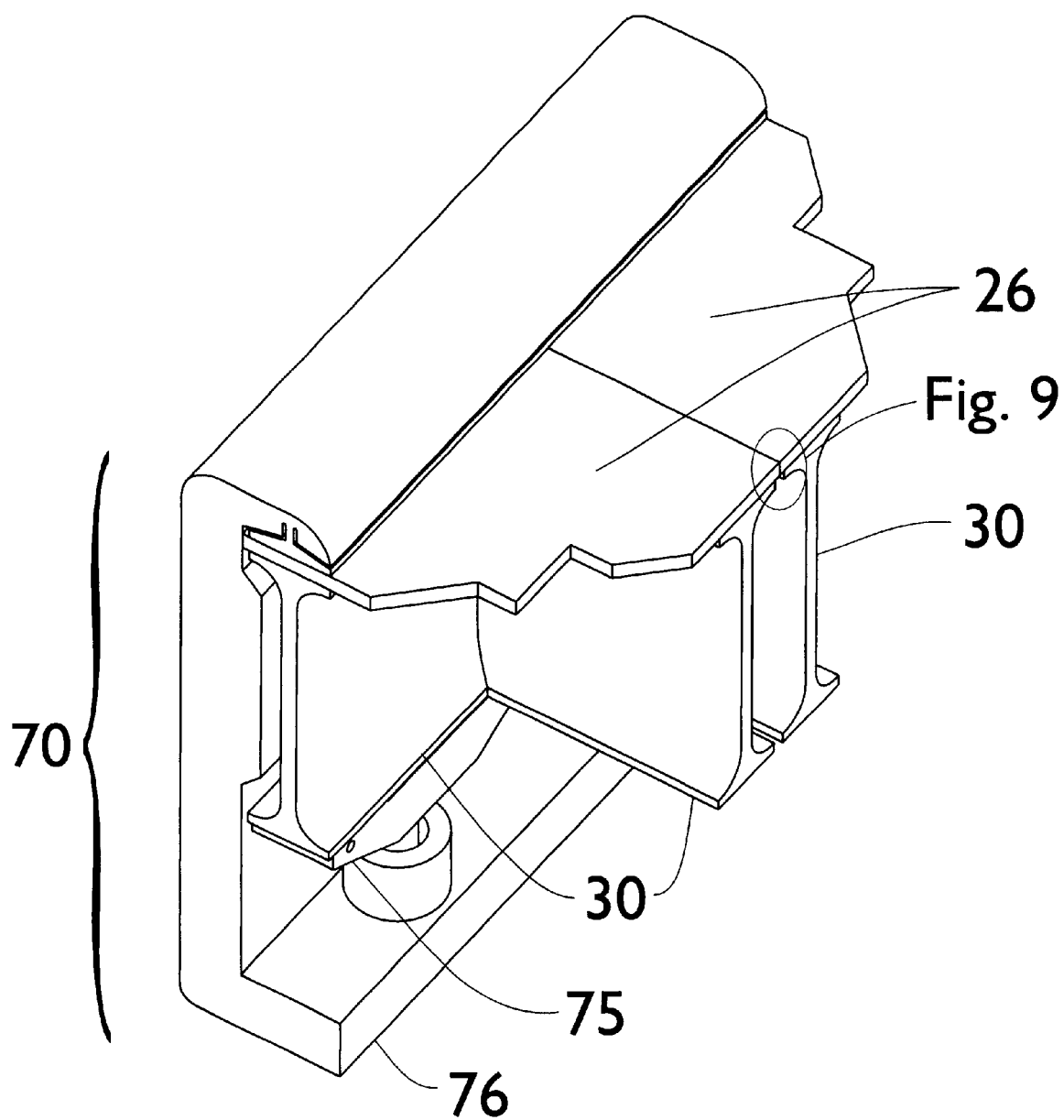
FIG. 9A shows a top view of two platen tiles joined, aligned, and clamped together.
Figure 9B:
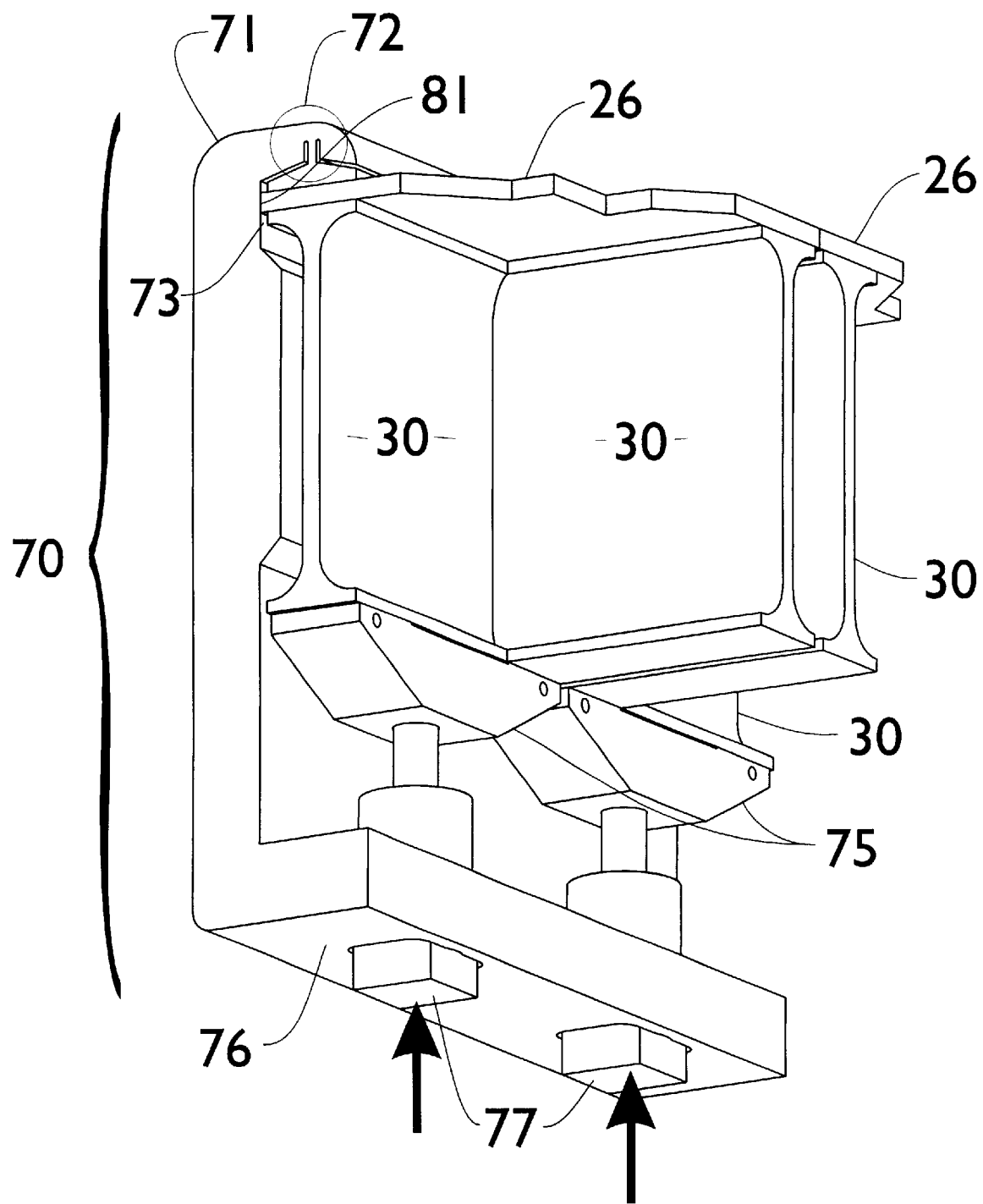
FIG. 9B is a bottom view of the situation illustrated in FIG. 9A.

Field-joinable platen tiles 10 to be joined at their edges 80 (as shown in FIG. 3) must have their top surfaces 26 at the same height and be mutually co-planar. Moreover, their pattern of teeth 22 must line up from one platen tile to the next. FIG. 9A shows the corners of two field-joinable platen tiles 10 held together by platen clamp 70 such that their top surfaces 26 are at the same height and are co-planar. (Platen tile 10, honeycomb 28, and bottom sheet 29 are omitted for clarity.) FIG. 9B is a lower elevation view of the situation depicted in FIG. 9A. Here, it is shown that platen clamp 70 is comprised of clamp body 71, flexure or hinge feature 72, bottom angle feature 76, pushing features 75 akin to vice jaws, and actuators 77. Platen clamp pushers 75 thrust against platen tile 10 frame members 30, forcing platen top surfaces 26 against the top of platen clamp body 71 at its surface immediately below flexure or hinge feature 72. The upward force developed by actuators 77 (shown by arrows in FIG. 9B) is derived by a downward force (not shown) exerted on bottom angle feature 76. Body 71 of platen clamp 70 may be examined closely by reference to FIG. 9C, where first horizontal precision reference surface 74 and second vertical precision reference surface 73 are revealed.

Figure 11A:
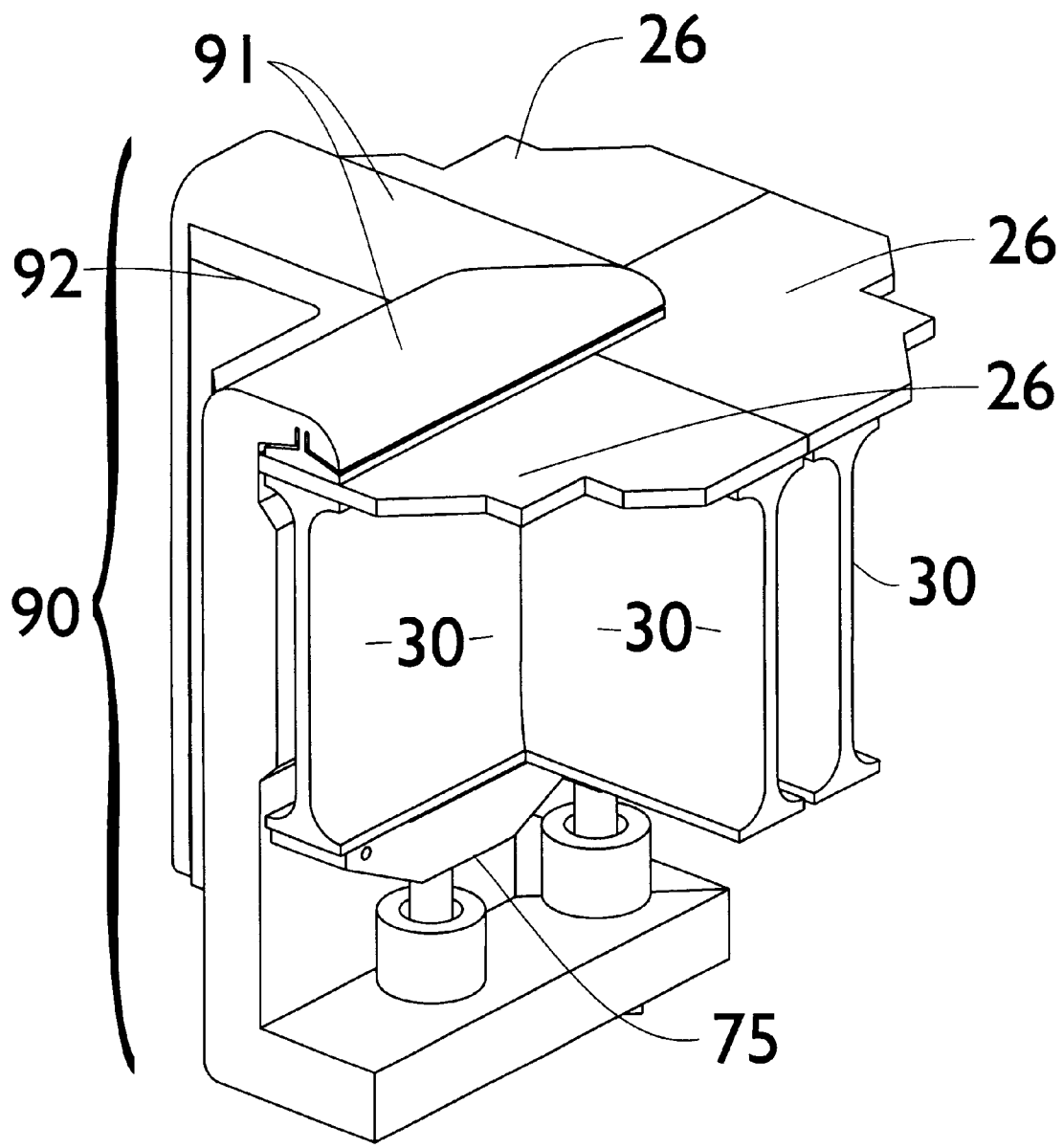
FIG. 11A shows three field-joinable platen tiles joined, aligned, and clamped together at a corner.
Figure 11B:
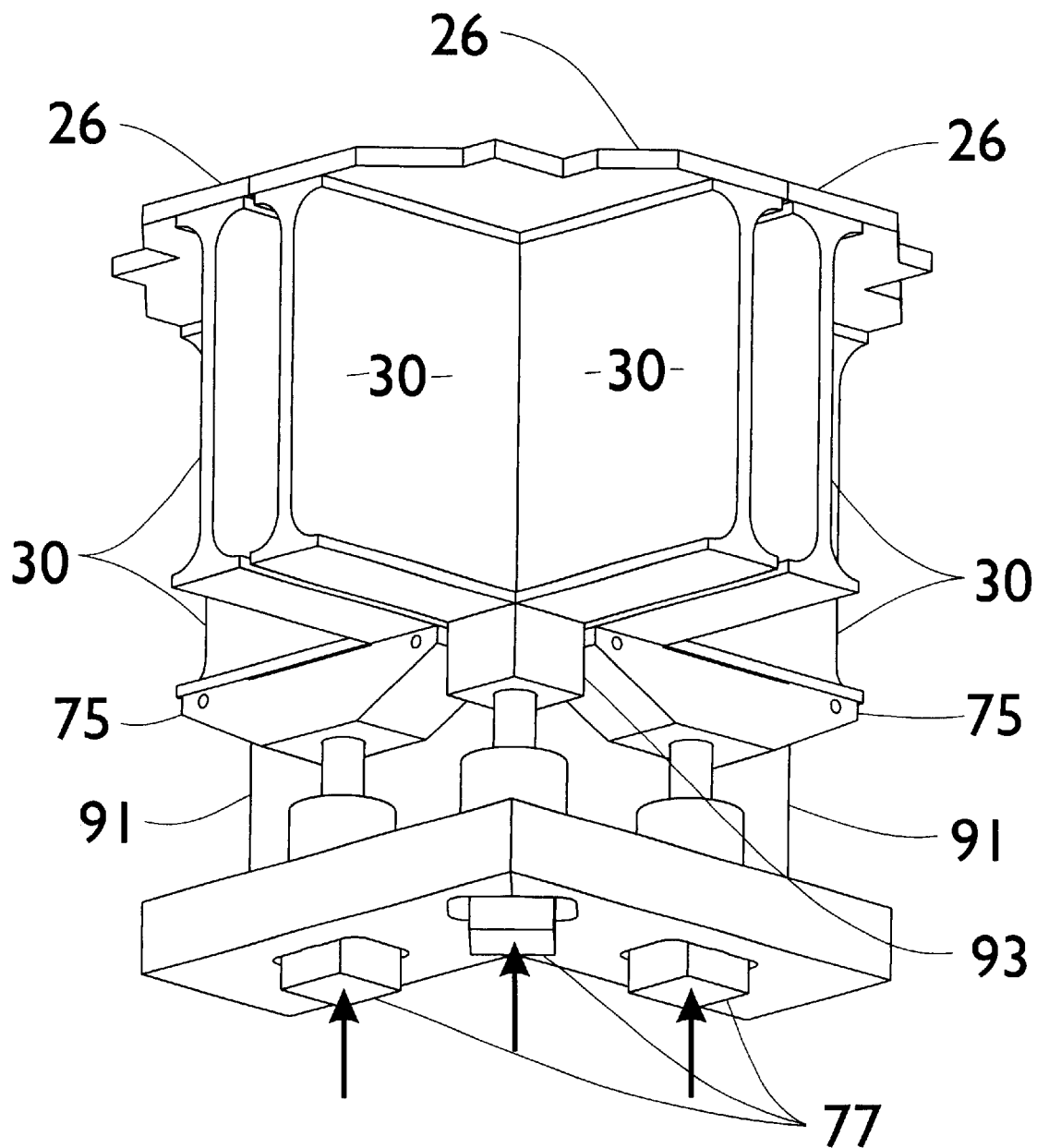
FIG. 11B is a bottom view of the situation illustrated in FIG. 11A.
Figure 12:
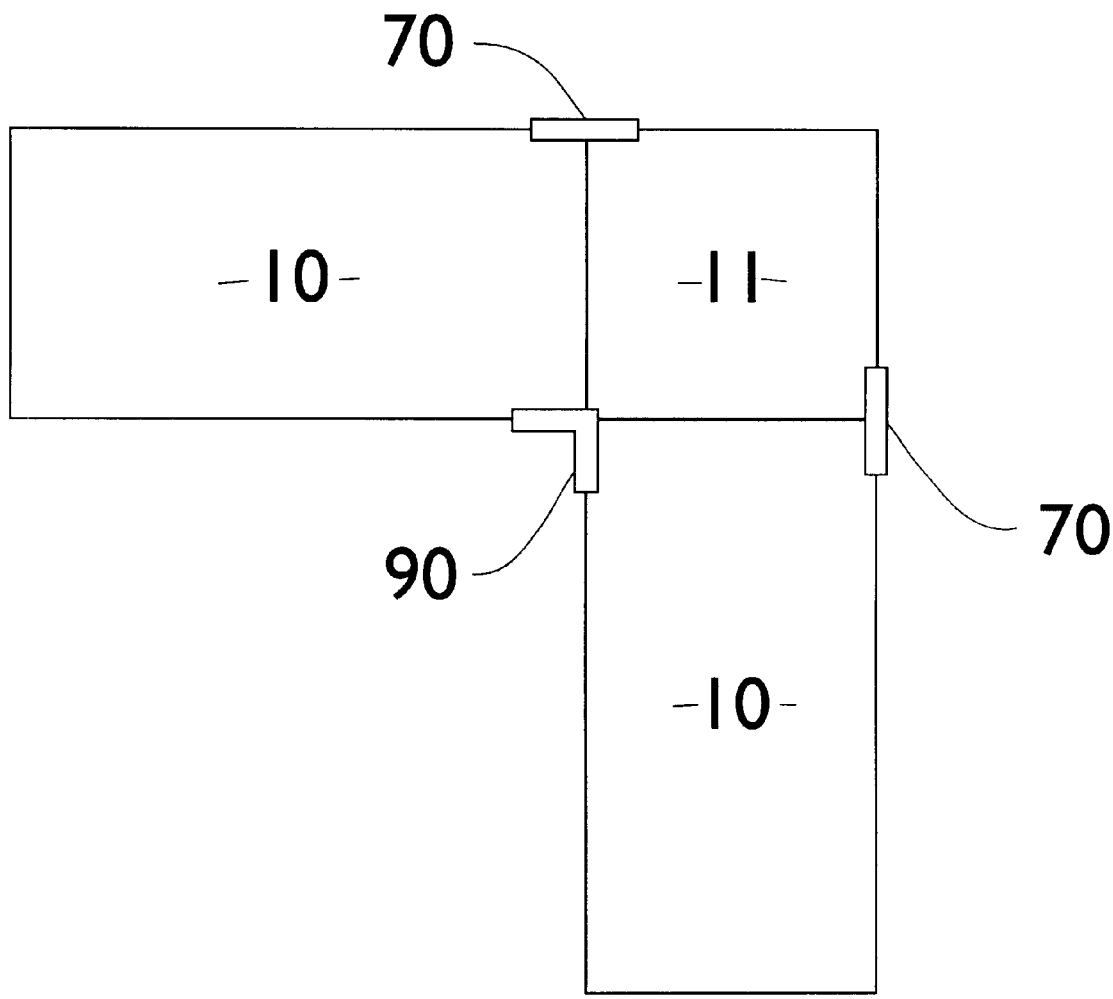
FIG. 12 is a view of three field-joinable platen tiles joined together at a common corner.

In addition to clamping a pair of field-joinable platen tiles 10 together, three tiles are joinable at a corner. In a preferred embodiment, this would involve two rectangular tiles 10 and one square tile 11 (see FIG. 12). This condition is illustrated in FIG. 11A, where top surfaces 26 of three platens are forced to be at the same height and co-planar by platen corner clamp 90. Platen corner clamp 90 has identical cross section to previously discussed platen clamp 70, except that two clamp bodies 91 are mitered together at right angles and rigidly held in place by attached corner bracket 92. FIG. 11B is an underside view of the situation shown in FIG. 11A, where a trio of pushers bear on three frames. 30. Two pushers 75 are identical to those which are a part of platen clamp 70 previously discussed. A third, smaller central pusher 93 acts on the corner of central square platen tile 11. Actuators 77 are identical to those previously discussed. FIG. 12 shows two rectangular platen tiles 10 and one square platen tile 11 field joined with two platen clamps 70 and one platen corner clamp 90.

Figure 13:
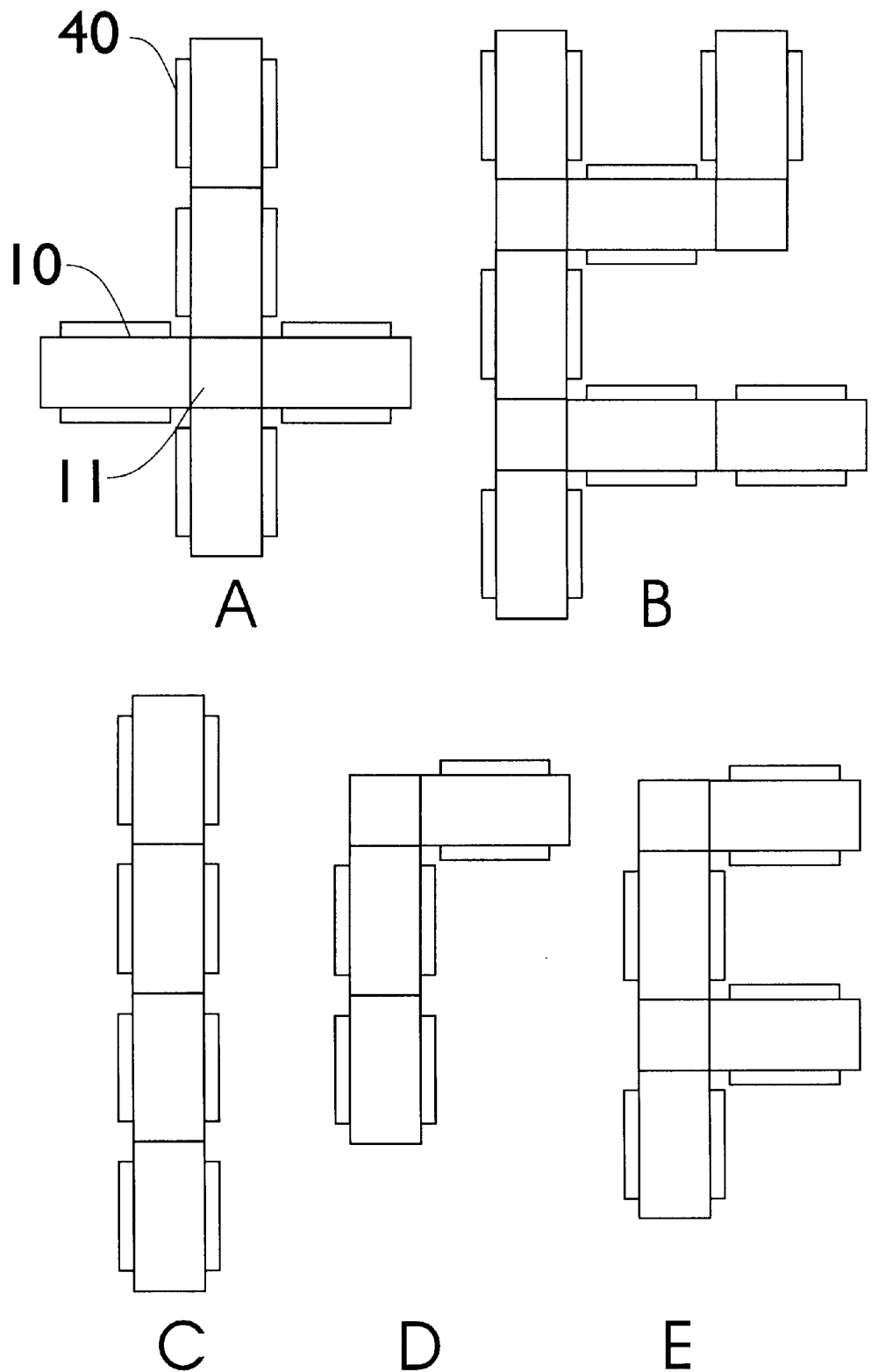
FIG. 13 shows several configurations of field-joined platen tile ensembles comprised of rectangular and square tiles.

FIG. 13 show five different top views among many in which field-joinable platen tiles can be combined to provide essentially contiguous platen ensembles. Configuration A shows 5 rectangular platen tiles 10 supported by bases 40 and 1 square platen tile 11 arranged in a cross. (Platen clamps 70, 90, and other features are omitted for clarity.) Configuration B shows a doubly-branched arrangement of 7 rectangular platen tiles 10 and 3 square platen tiles 11. Configuration C shows 4 rectangular platen tiles 10 arranged linearly. Configuration D shows 3 rectangular platen tiles 10 and one square platen tile 11 in an L-shaped layout. Configuration E shows 4 rectangular platen tiles 10 and 2 square platen tiles 11 in an F-shaped layout.

OPERATION OF THE PREFERRED EMBODIMENT—FIGS. 1–13

FIG. 1 is an overview of field-joinable platen tiles for planar motors showing two tiles 10 temporarily joined together in a manner to allow a planar motor (sometimes referred to as a planar linear motor) 12 supported by its air bearing to operate successfully even when crossing the interface crack between the pair of platen tiles 10. Each tile functionally forms the electromagnetic stator providing reaction forces for multiple planar motors 12 to operate on its surface. Unlike prior art platens, the tiles 10 shown in FIG. 1 can be quickly joined together and taken apart in the field where they may be part of a functional motion system, rather than joined permanently during manufacture, which fact comprises the central element of this invention.

Figure 2B:
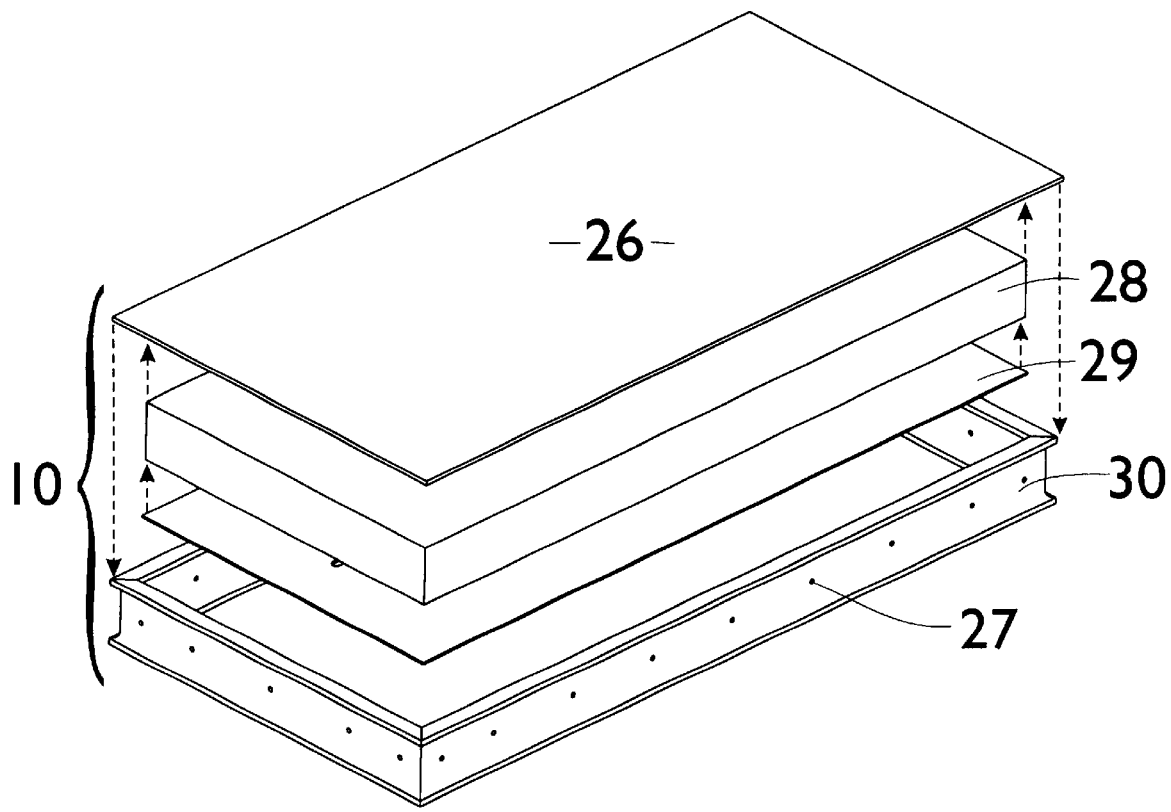
FIG. 2B is an exploded view showing construction of the field-joinable platen tile shown in FIG. 2A.

Referring to FIG. 2A which shows a complete field-joinable platen tile for planar motors, and FIG. 2B, it may be seen that platen tile 10 is comprised of top sheet 26, honeycomb core 28, bottom sheet 29, and surrounding frame 30. This construction provides a very light weight and portable platen tile of high strength. Top sheet 26 is of ferromagnetic material, preferably a low carbon steel or other material of high magnetic permeability and low magnetic coercivity acting as a passive stator and magnetic return path for multiple planar motors 12 in operative juxtaposition above its surface. Top sheet 26 must be very substantially flat (typically within a few micrometers) to accomodate the air bearings of planar motors 12 which fly over it at typical altitudes of 10–15 micrometers as is well known in the art. Honeycomb core 28 is preferably of steel or aluminum typically formed in a pattern of light-weight hexagonal cells (see FIG. 3) and is rigidly sandwiched and bonded between top sheet 26 and bottom sheet 29. As is well known in the art, such a combination of top sheet, core, and bottom sheet forms a light weight structure of extreme strength, rigidity, and long-term stability. Planar motor platens constructed with this principle are known in the prior art but are not field-joinable. In the construction of field-joinable platen tiles, however, the aforementioned sandwich formed by top sheet 26, honeycomb core 28, and bottom sheet 29 is additionally bonded to surrounding frame 30 whose features permit joining and taking apart in the field. Surrounding frame 30, recessed a small distance inside the overhanging edges of top sheet 26 is preferably made of structural steel of cross-section suitable for withstanding large applied loads without appreciable deflection. Threaded holes 27 permit the attachment of auxiliary curbs or bumpers (not shown) extending above top surface 26 for the purpose of preventing planar motors from inadvertently flying off the sides of platen 10. (These curbs can be of various design and materials, and are not functionally relevent to the operation of field-joinable platen tiles for planar motors.)

A more detailed view of the upper surface of platen top sheet 26 is given by FIG. 3. A two-dimensional array of operational features comprised of platen teeth 22 are formed in the upper surface of 20, and interact electromagnetically with several elements which comprise one-dimensional arrays of teeth present in planar motor 12 to provide reaction forces in a manner well known in the art. Non-magnetic material 24, preferably an epoxy compound, fills in the space between teeth 22 to provide a planar surface for the air bearing of planar motor 12. As shown in FIG. 3, the illustrated patches showing teeth 22 constitute but a small portion of the area of top sheet 26, owing to their small size. In prior-art platens which are not field-joinable, there is no need for the array of teeth 22 to be well aligned with the edges of platen top sheet 26. For field-joinable platen tiles, however, it is critical that the array of teeth 22 be in substantially perfect alignment with the edges of platen top surface 26 to permit accurate joining of multiple platen tiles 10. Teeth 22 are spaced in an array of pitch $\lambda$, and therefore the platen tile must have dimensions of precisely $n\lambda \times m\lambda$ where n and m are positive integers, to permit an unbroken pattern of teeth when platen tiles 10 are conjoined. To permit joining at either a first edge 80 of a platen tile or a second, opposite edge, it is necessary that there is a half tooth-pitch space $\lambda/2$ between mating edge 80 and the array of teeth 22 as well as a half tooth-pitch space $\lambda/2$ between side edge 81 and the array of teeth 22.

Referring to FIG. 4, field-joinable platen tile 10 is supported by three or more precision height adjustment mechanisms 50 attached to a base 40 which, in turn, is supported by three or more coarse height adjusters 42. These latter devices 42 are typically types of adjustable feet commonly available in catalogs and whose details are unimportant for the present discussion. Base 40 can be of various designs to support platen tile 10 at a convenient height above the floor and is likewise of no consequence for the present discussion. Three or more precision height adjustment mechanisms 50 of special design support the platen.

As shown in FIG. 5, support is provided by precision height adjustment mechanisms 50. It is necessary to support platen tile 10 in an even manner to avoid inadvertant twist, and to support an ensemble of tiles 10 on bases 40 (FIG. 13) such that the critical upper operative surfaces of top sheets 26 are co-planar. This latter requirement is most readily accomplished by ensuring that all platen tiles 10 in an ensemble are substantially level (i.e., the gravity vector is strictly normal to the top surfaces of each of the platen tiles 10), and moreover that all top surfaces 26 of platen tiles 10 are at the same height. These requirements, taken together, demand height adjustment mechanisms 50 which are exceedingly precise in their operation. Mechanisms of this type are not present in prior-art platen designs or prior art platen support structures.

Figure 6B:
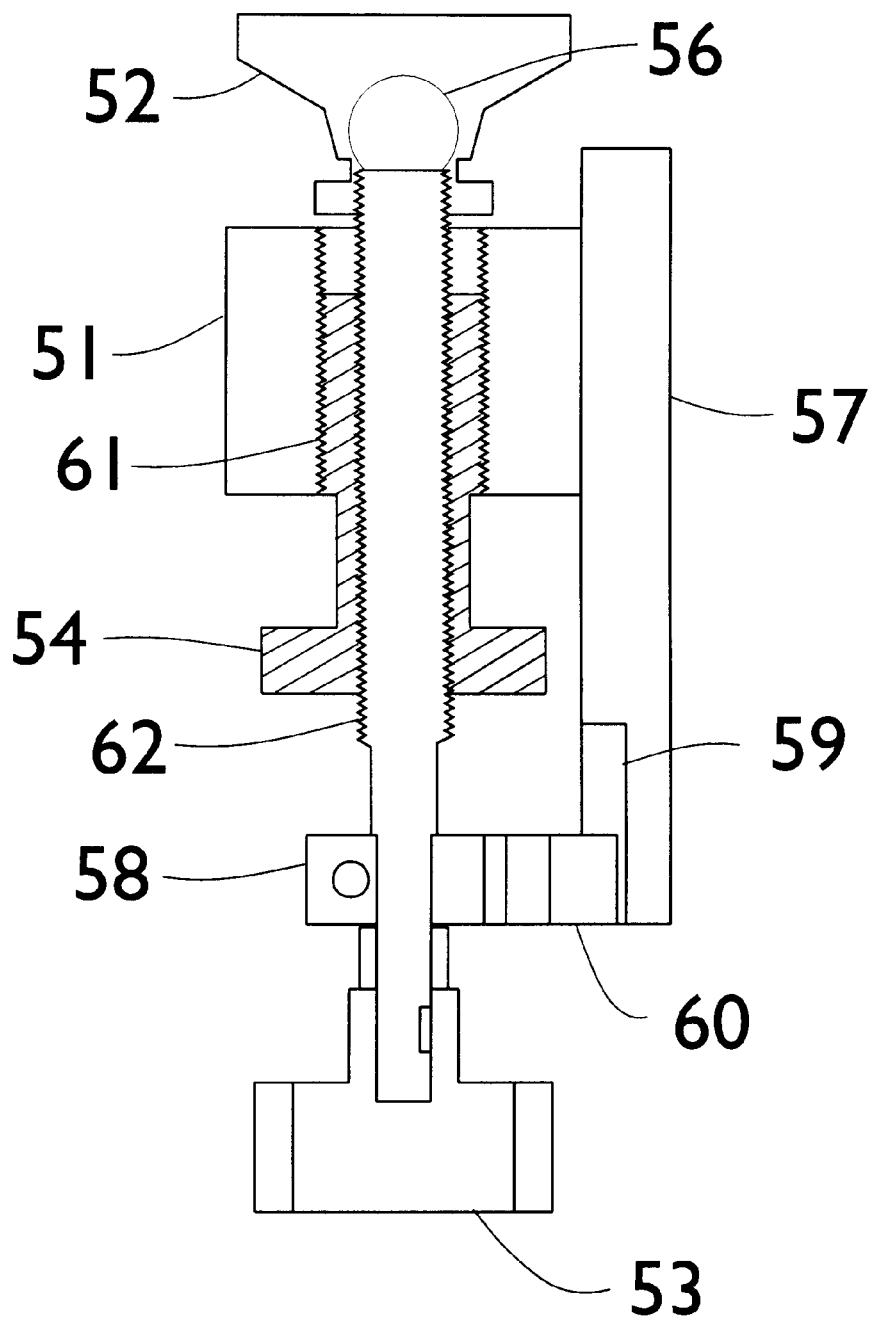
FIG. 6B is a cross-sectional view of the mechanism shown in FIG. 6A.
Figure 7A:
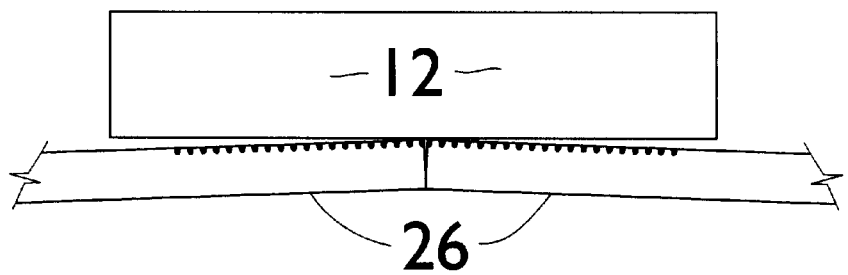
FIGS. 7A–7D illustrate several problems encountered when joining a pair of platen tiles as well as the correct joining condition.
Figure 7B:
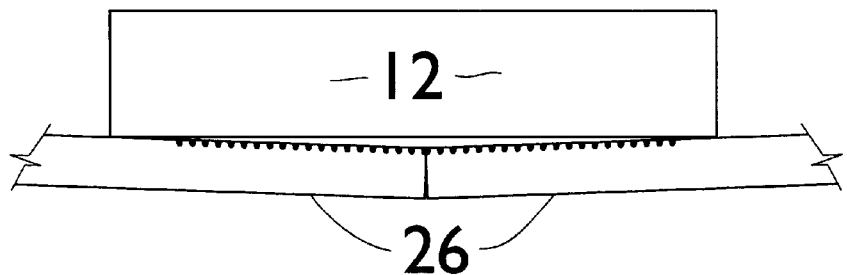
Figure 7C:
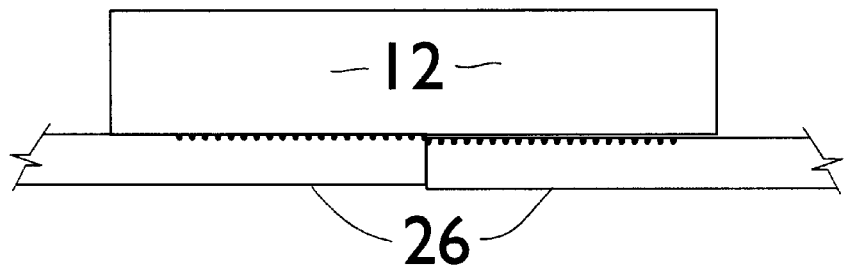
Figure 7D:
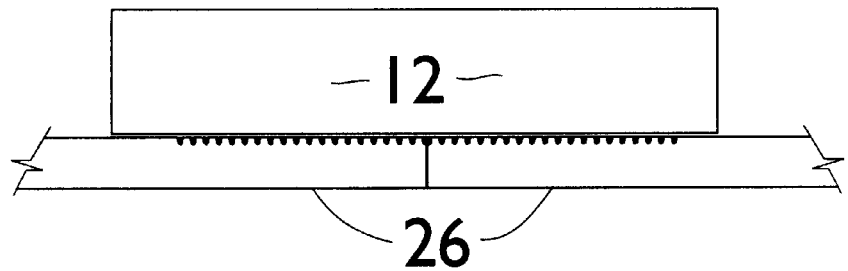

FIGS. 6A and 6B show the operation of precision height adjustment mechanism 50, whose basic principles are well known in the art. Nevertheless, features necessary for field-joinable platen tiles for planar motors are hereby disclosed. Mechanisms based on this principle are sometimes referred to as "differential screws." Mounting plate 57 and housing 51 constitute stationary parts of precision height adjustment mechanism 50. When locking knob 55 is loosened, the platen tile height can be coarsely adjusted upward or downward by turning coarse adjustment knob 53, rigidly attached to coarse screw 62, thereby moving swivel pad 52 upward or downward. On the other hand, once the desired platen tile elevation and levelness is approximately achieved by rotating coarse adjustment knobs 53 of the several height adjustment mechanisms 50 supporting platen 10, a fine adjustment operation can commence. Fine adjustment of the height and levelness of platen tile 10 is achieved by first locking split tang clamp 58 by rotating locking knob 55. Fine height and levelness adjustment is then carried out by rotating fine adjustment knob 54. When knob 54 is turned, e.g., clockwise, it advances upward in housing 51, assuming right-hand threads 61. This action causes coarse screw 62 to move downward, as if coarse screw 62 were being rotated counter-clockwise. In actuality, coarse screw 62 cannot rotate, since it is held in place by the locked clamp 58. The net result is that swivel pad 52 moves upward by an amount related to the difference in screw pitch between threads 61 and 62. If the pitch of 61 is $N_1$ and the pitch of 62 is $N_2$, then the effective pitch of the combination is $N_{eff} = N_1 \times N_2$. For example, if $N_1 = 12$ threads/in. and $N_2 = 13$ threads/in., then $N_{eff} = 12 \times 13 = 156$ threads/in., thereby allowing exceedingly fine (micrometer level) adjustment. During such fine adjustment, split tang 60 riding tightly upward or downward in slot 59 prevents coarse screw 62 from rotating, which would spoil the fine adjustment. During the described coarse or fine adjustment of platen tile 10, a precision spirit level (well known in the art) resting on platen surface 26 can be used to monitor the degree of levelness. Additionally, a precision straightedge resting on a pair of mating platen tiles 10 can be used to monitor the angle between their top surfaces 26. The capability for precisely and easily adjusting platen tile 10 height and levelness is an integral part of field-joinable platen tiles for planar motors.

Without the capability for precise height and levelness adjustment for platen tile 10, problems illustrated in FIGS. 7A–7D result. In the first case shown in FIG. 7A, a positive angle is shown between surfaces 26 of adjacent platens, causing planar motor 12 to touch at the location of the joint. In the second case shown in FIG. 7B, a negative angle is shown between surfaces 26, causing planar motor 12 to touch at its edges. In the third case shown in FIG. 7C, a vertical height difference is shown between surfaces 26, causing planar motor 12 to touch the higher surface. In general, there may simultaneously be both a height difference and nonzero angle between the surfaces. The correct alignment condition is shown in the fourth case by FIG. 7D. To fully understand the criticalness of these alignment conditions, it is useful to consider the dimensions involved. Planar motor 12 typically operates at altitudes of 10 to 15 micrometers above platen surface 26, as is well known in the art. On the other hand, typical planar motor dimensions may be up to 150 mm square, as can be ascertained from manufacturers' data sheets. Using an air bearing thickness of 10 micrometers, from the simple geometry depicted in FIGS. 7A–7D, the maximum angular misalignment must be no more than 0.009°. Even if the angular alignment is perfect, the maximum height difference must be no more than 10 micrometers. These conditions must obtain along the entire length of the joint (interface crack) between platen tiles 10 (refer to FIG. 1), underscoring the need for precise adjustment capability as well as an extreme level of structural stability in platens 10. Moreover, both platen tiles 10 once adjusted must be rigidly fastened together to resist possible environmental disturbances.

Figure 8:
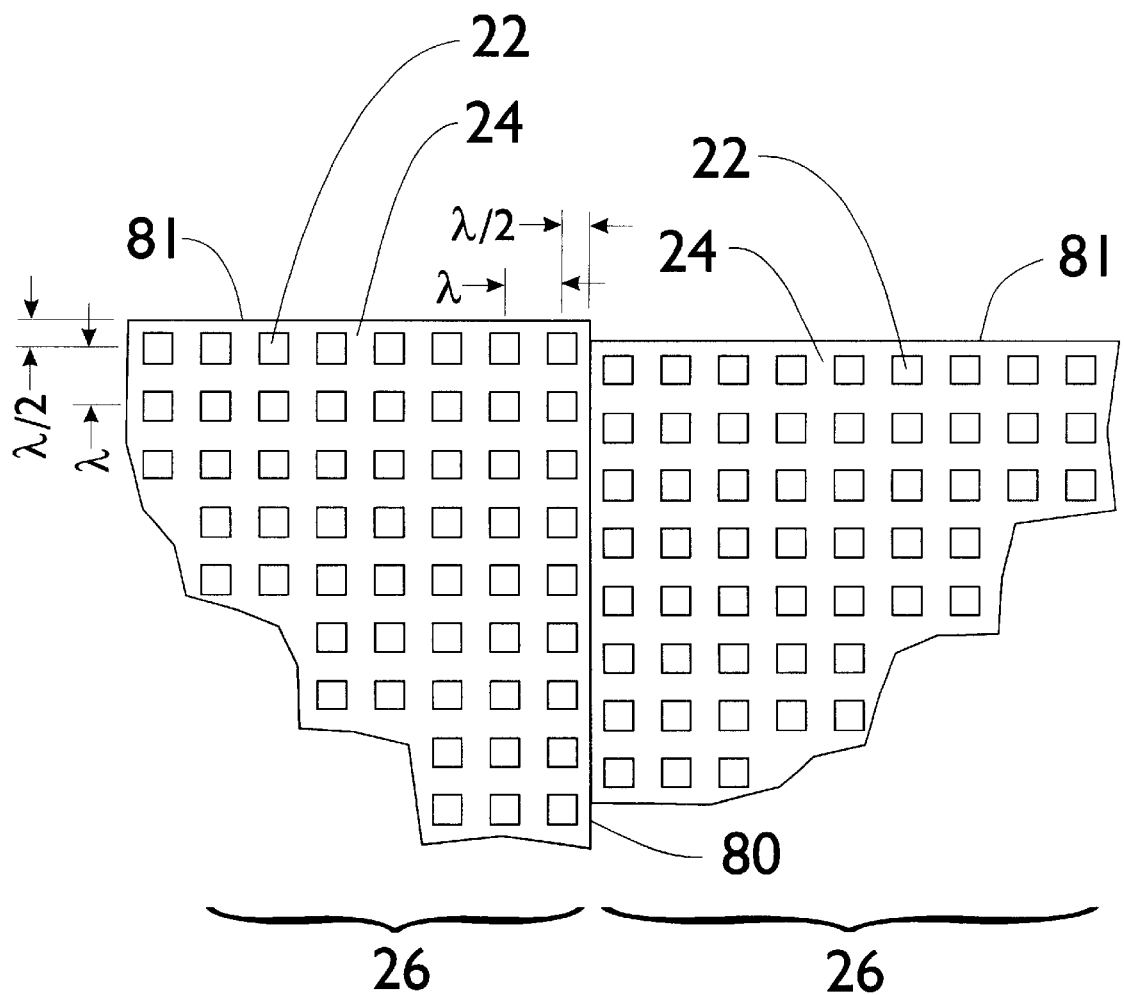
FIG. 8 illustrates several problems encountered when aligning the side edges of a pair of platen tiles.

Further, even if the vertical alignment conditions discussed above are met, there remains the need to laterally align platen tiles 10 within the plane of their surfaces 26 to provide a continuous and uniform array of teeth 22 between platen tiles. A lateral misalignment of platen top surfaces 26 is illustrated in FIG. 8. Here, edges 81 of platen top surfaces 26 are misaligned, causing an offset of teeth 22 between the two surfaces along the joint edges 80.

Figure 9C:
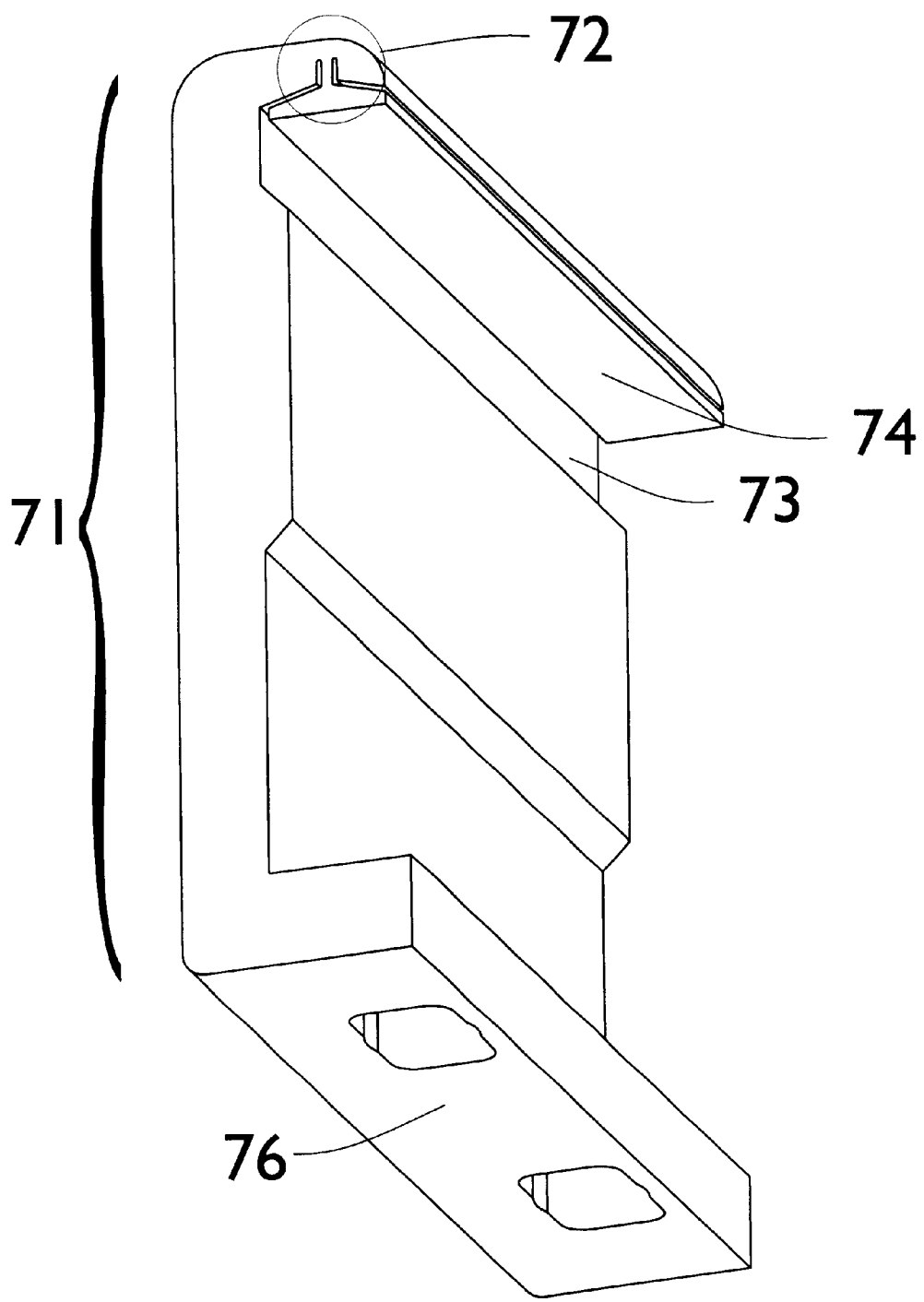
FIG. 9C is a view of the clamp body of FIG. 9A, showing precision reference surfaces.

To substantially eliminate angular misalignments and height differences between platen tiles 10 as well as substantially eliminate lateral misalignments, platen tiles 10 are joined mechanically by platen clamp 70 illustrated in FIG. 9A, an integral part of field-joinable platens for planar linear motors. Details of operation are shown in FIG. 9B, where actuation forces developed by actuators 77 relative to platen clamp body 71 cause pushers 75 to exert strongly against platen surrounding frames 30, forcing top surfaces 26 tightly against first precision reference surface 74 of flexure or hinge feature 72 (FIG. 9C). Note that the overall thicknesses of mated platen tiles 10 need not be the same, their possible differences in thickness being compensated by the operation of platen clamp actuators 77. Details of actuators 77 are unimportant, but the actuators could be based on standard over-center toggle devices such as those marketed by De-Sta-Co, or on screw mechanisms equipped with knobs or handles. The action of forcing platen top surfaces 26 together ensures that these surfaces be co-planar. Additionally, if each of platen tile side edges 81 of each platen tile 10 are against second precision reference surface 73 prior to clamping, edges 81 will be in correct alignment.

Thus to operatively join a pair of field-joinable platen tiles, in Step 1 a first tile 10 must be placed over a base 40, whereupon it is subsequently leveled to a high degree of precision by a plurality of precision height adjustment mechanisms 50. In Step 2 platen clamp 70 is clamped to one side of one end of first tile 10 in the manner previously described using one of the actuators 77. In Step 3 a second tile 10 is then placed on an adjacent base 40, leveled, and brought to the same height as the first tile using the adjustment mechanisms 50 of the second base 40. In Step 4 second tile 10 is slid (over tops of swivel pads 52) into contact with first tile 10 such that mating edges 80 are in contact and edge 81 of second platen 10 is in contact with second precision reference surface 73, whereupon remaining actuator 77 is activated, thereby clamping the two platen tiles together at their corners. In Step 5 a second platen clamp 70 is placed on the corners of platen tiles 10 opposite to the first clamp.

In Step 6 both actuators 77 of second platen clamp 70 are activated, thereby forming a precise and rigid temporary connection between the pair of conjoined platen tiles 10.

Figure 9D:
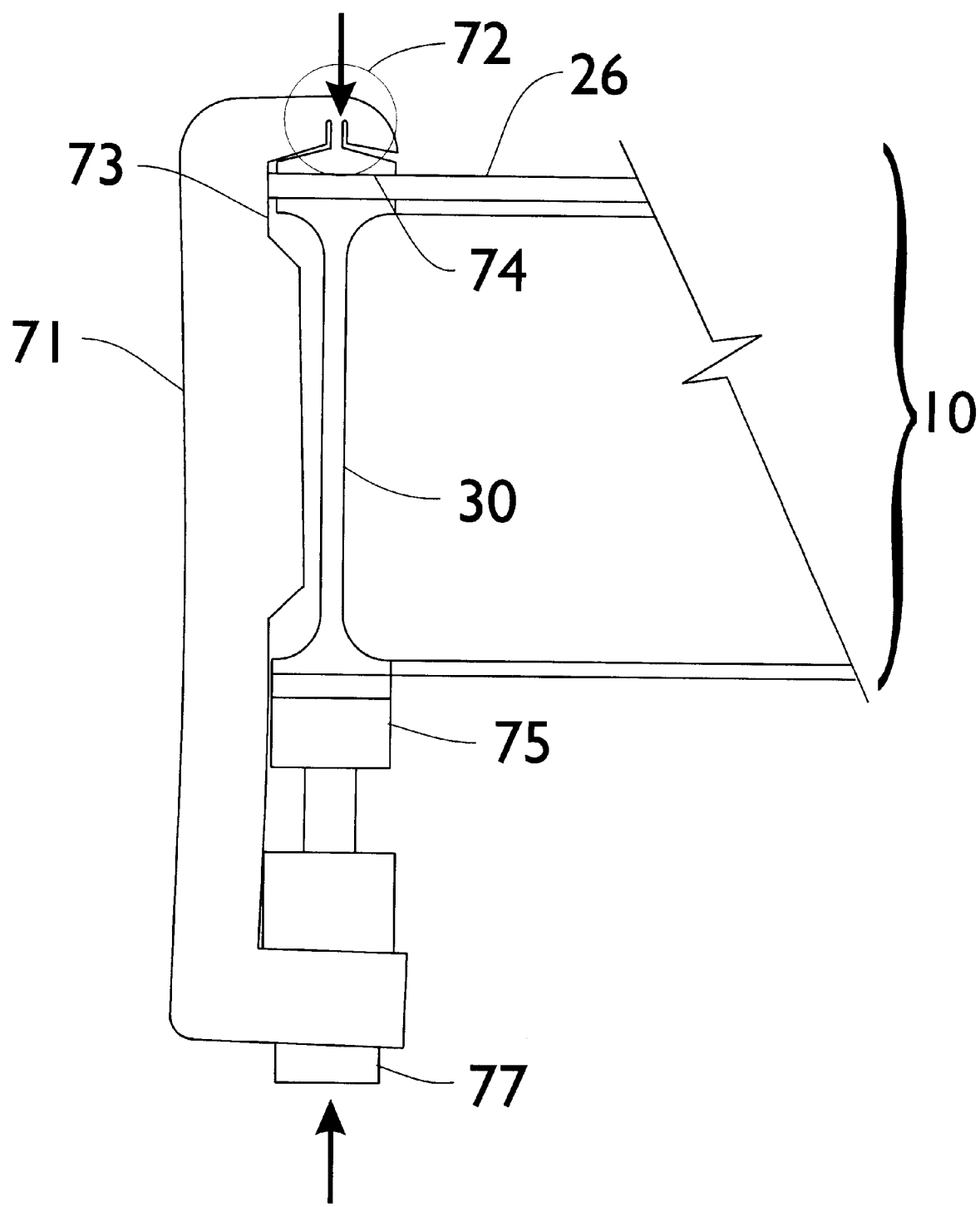
FIG. 9D is an end view of the situation illustrated in FIG. 9A, additionally showing the effects of strain in the clamp.

Referring to FIG. 9D, it is seen that large clamping forces (shown by the arrows) cause clamp body 71 to bend slightly (exagerated in the figure), yet top portion 72 of clamp body 71 must remain level, applying uniform downward pressure on top surfaces 26 of platens 10 to avoid bending or distorting them as may cause a diminishment in planarity of top surfaces 26 in the vicinity of platen clamp 70. Flexure feature 72 serves to minimize effective rotation of first precision reference mating surface 74 (FIG. 9C) by bending slightly under load. Alternatively, a hinge feature could serve the same purpose. FIG. 9D also serves to illustrate the function of platen surround frame 30 which must support a large compressive stress without appreciable deflection.

Figure 10:
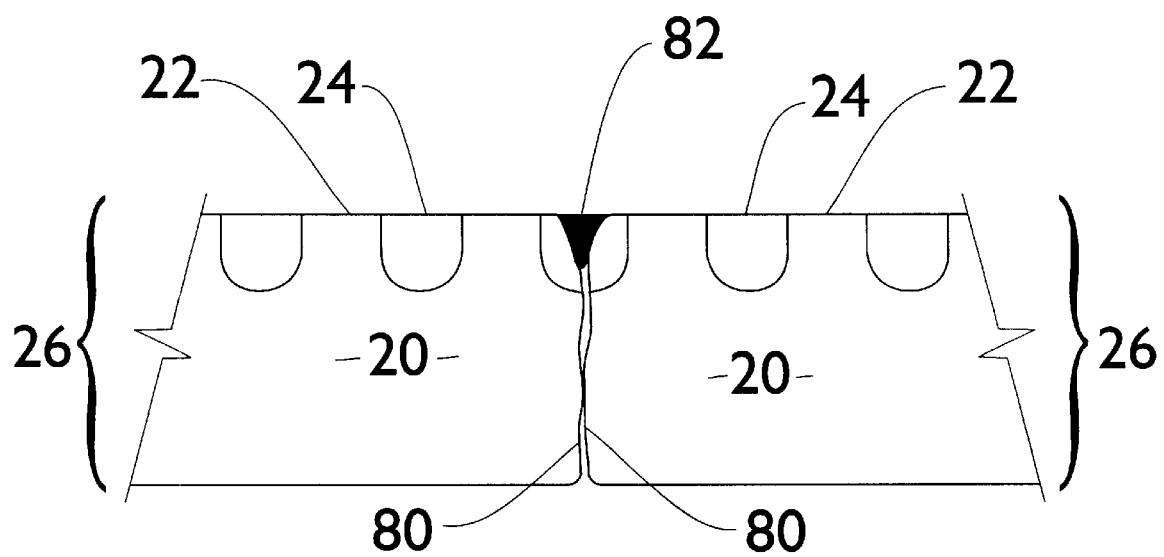
FIG. 10 is a highly-magnified cross-sectional view of the joined edges of the platen tiles shown in FIG. 9A.

The preceding discussion has outlined how mechanical continuity between mating platen tiles 10 is achieved. The operation of planar motors 12 over platen surfaces 26, however, also requires magnetic continuity and air bearing continuity. FIG. 10 is a highly-magnified cross-sectional view of mating top surfaces 26 showing platen teeth 22, non-magnetic backfill 24, and mating edges 80. The surface roughness of edges 80 is exagerated in the figure, but reflects the realities of machined metal surfaces. No matter how well these edges are made, there will exist pathways in the mating crack which will allow air to escape from the air bearing of planar motors 12. This possibility is eliminated in an additional Step 7 where a high polymer material 82, such as wax or a similar substance is rubbed into the crack and scraped level to form a temporary air bearing seal. There remains a magnetic discontinuity at the crack, which can be partially ameliorated by addition of ferromagnetic powder to polymer 82. Since only a small portion of planar motor 12 passes over the crack at any one time, a noticeable, but manageable reduction of drive force is experienced, which is normally not problematic. Thus the addition of polymer 82 with or without ferromagnetic powder is an integral part of field-joinable platen tiles for planar motors.

Besides field-joining of platen pairs, three platen tiles may be joined by this method at a corner. In a preferred embodiment, two rectangular tiles 10 and one square tile 11 are joined at a corner. This condition is illustrated by FIGS. 11A and 11B. Step-by-step procedures for joining three tiles is the same as that discussed above for pairs of platens 10 except two rectangular platen tiles 10 are first joined at their corners with corner clamp 90, followed by the addition of square platen tile 11, and two more platen clamps 70. Generally, it is unnecessary to support square platen tile 11 with a base 40, as it can be supported by the trio of platen clamps (two clamps 70 and one clamp 90). FIG. 12 shows two rectangular platen tiles 10 and one square platen tile 11 joined together in the field. Planar motors 12 can operate on all three platen tiles with the ability to cross between tiles.

FIG. 13 shows five different configurations of rectangular platen tiles 10 and square platen tiles 11, illustrating some of the many ways platen tiles can be combined to provide branching "highways" for planar motors 12. Because of the inherent principles contained in field-joinable platen tiles for planar motors, including their various support and attachment hardware as detailed above, diverse platen ensembles can be readily assembled and dis-assembled in the field to meet a variety of needs. For example, planar motors may carry products through a manufacturing system where there is need to branch (e.g., good products go one way and bad products go another) or merge (e.g., a sub-product travelling over one set of platen tiles is combined with a product travelling over another set of platen tiles).

DESCRIPTION AND OPERATION OF ANOTHER EMBODIMENT—FIG. 14

Whereas the invention has heretofore been described by particular reference to a preferred embodiment, it will be readily recognized that many modifications are possible without departing from the novel teachings and advantages of field-joinable platen tiles for planar motors.

Figure 14:
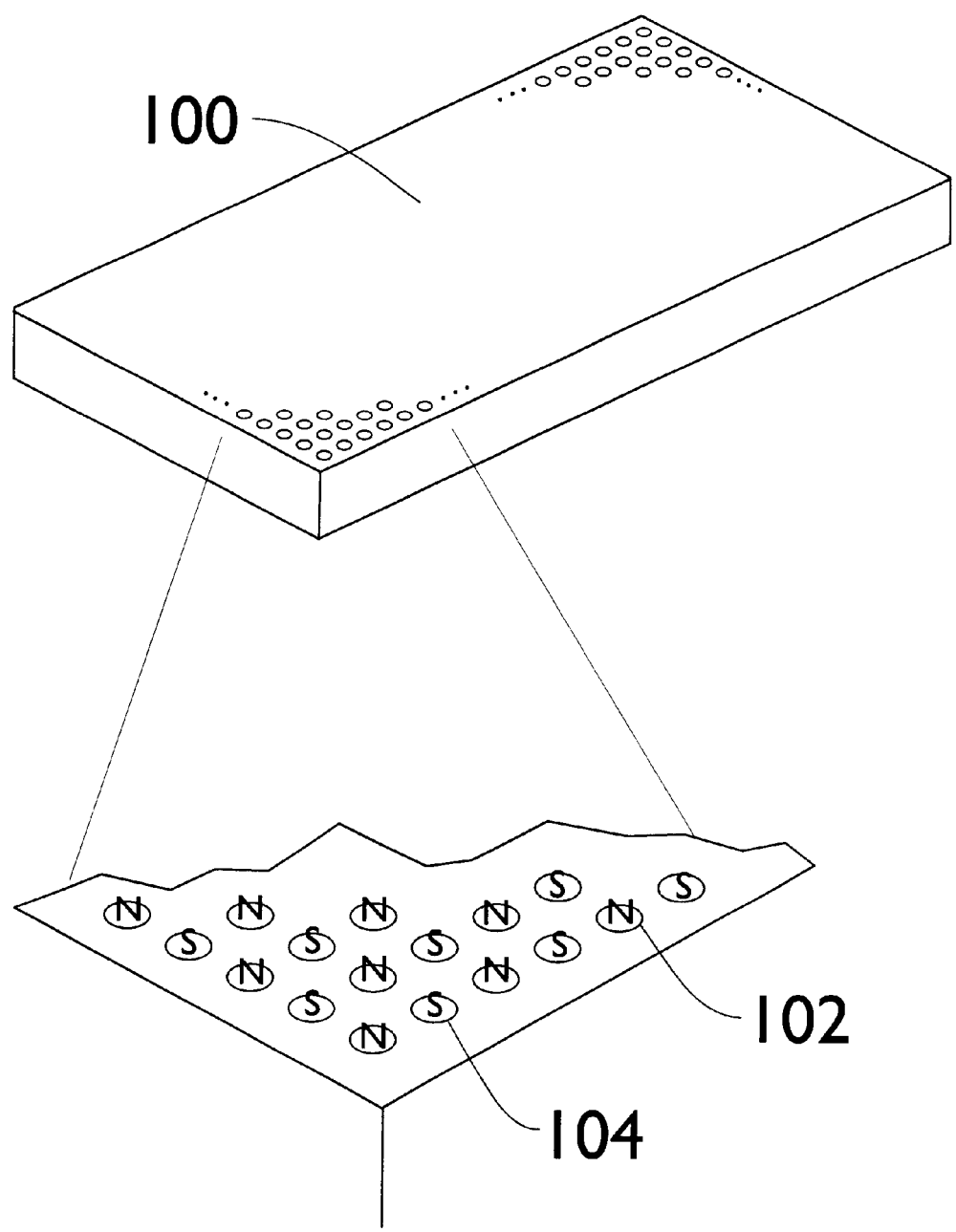
FIG. 14 shows another embodiment of a field-joinable platen tile wherein permanent magnets are incorporated in the operational surface.

For example, there are several forms of planar motors extant. Planar motor 12 shown in FIG. 1 previously discussed need not operate on the principle of electromagnetic interaction between toothed structures. FIG. 14 shows a platen tile 100 for planar motors that contains an embedded array of operative features that are permanent magnets as is known in the art. North-pointing magnets 102 and south-pointing magnets 104 alternate with each other to form a magnetic array of period A covering the operative surface of platen tile 100. Such a platen tile can operate with a planar motor containing coil elements that are switched according to the motor's position over such a magnet array. The coil elements interact electromagnetically with the magnet elements in a well-known manner such that reaction forces are developed between the planar motor and platen.

Clearly, such a platen tile 100, constructed in accordance with the teachings of this invention and in conjunction with the provisions illustrated in FIGS. 1–13 will constitute another embodiment of field-joinable platen tiles for planar motors and can be configured with other tiles in the manner illustrated in FIG. 13.

DESCRIPTION AND OPERATION OF YET ANOTHER EMBODIMENT—FIG. 15

Figure 15:
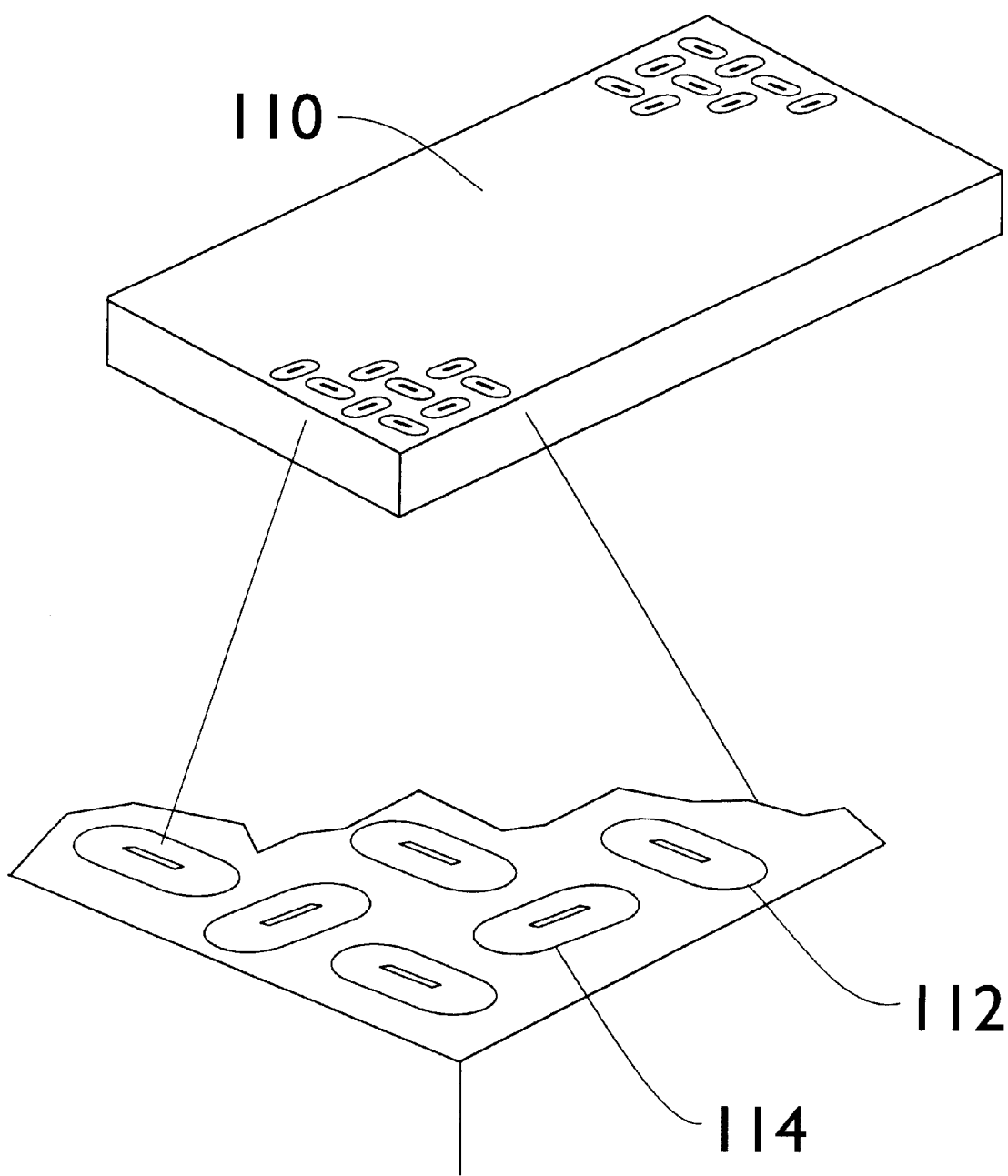
FIG. 15 shows another embodiment of a field-joinable platen tile wherein electric coils are incorporated in the operational surface.

As yet another embodiment of the invention, refer to FIG. 15. In this figure, it is shown that platen tile 110 has a number of flat-wound coils 112 and 114 embedded in its surface in an array of period $\lambda$. Coils 112 have long axes aligned with the short edge of platen tile 110, whereas coils 114 have their long axes aligned with the short edge of platen tile 110. Other coil arrangements are possible. Planar motor 12 shown in FIG. 1 but of a type containing only permanent magnet elements can operate on platen tile 110. Such a platen tile must switch electric currents through coils 112 and 114 to affect motion of planar motor 12. As before, the magnet elements interact electromagnetically with the coil elements in a well-known manner such that reaction forces are developed between the planar motor and platen.

Clearly, such a platen tile 110, constructed in accordance with the teachings of this invention and in conjunction with the provisions illustrated in FIGS. 1–13 will constitute yet another embodiment of field-joinable platen tiles for planar motors which can be configured with other tiles in the manner illustrated in FIG. 13.

DESCRIPTION AND OPERATION OF STILL ANOTHER EMBODIMENT—FIGS. 16, 17

Figure 16:
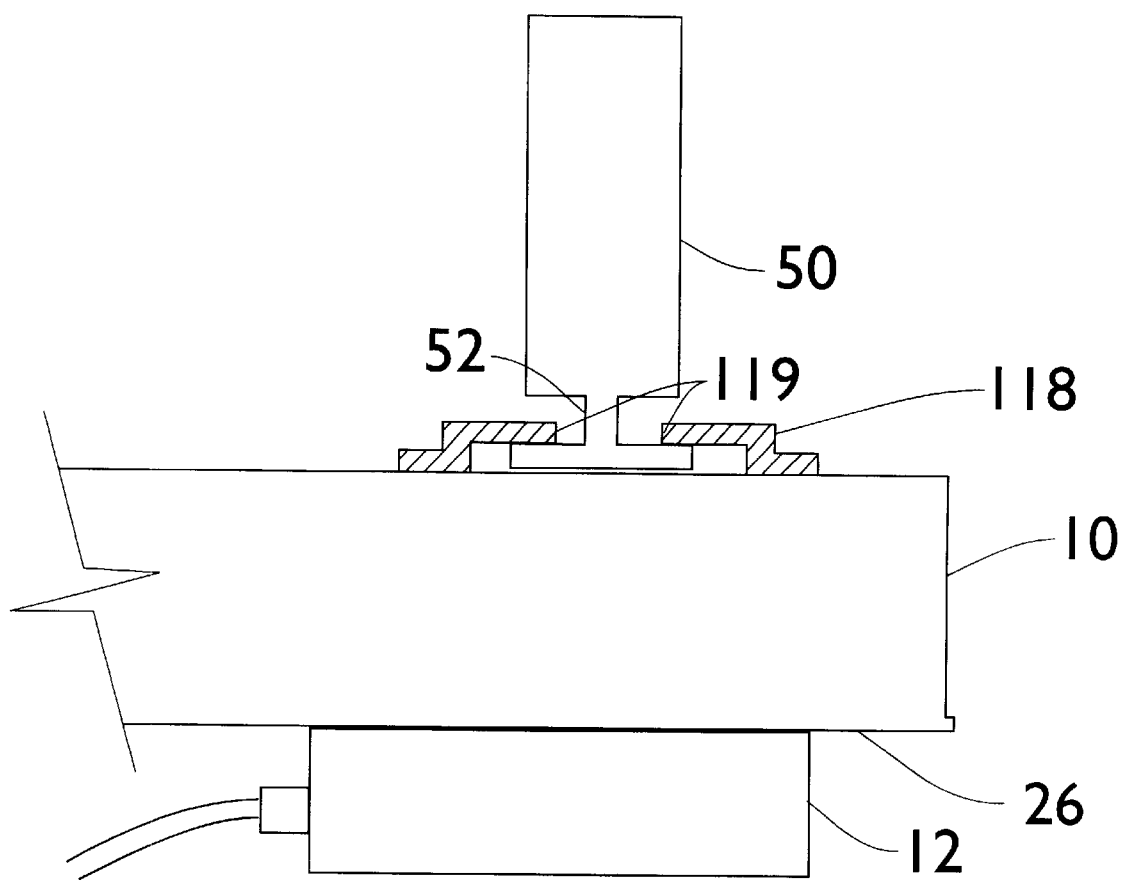
FIG. 16 is a detailed view of a field-joinable platen tile suspended from a precision height adjustment mechanism.

As still another embodiment of the invention, it is recognized that planar motors 12 are capable of operating inverted from that shown in FIG. 1. That is, instead of operating over a platen whose operational surface is facing upward, such motors may operate hanging underneath a platen whose operational surface is facing downward, as is well known in the art. This embodiment of the invention is illustrated by FIG. 16, where precision height adjustment mechanism 50 actively suspends platen tile 10 by means of capture feature 118 (shown in cross section) rigidly affixed to platen tile 10. Capture feature 118 has opening 119 substantially larger than upper portion of swivel pad 52 on precision height adjustment mechanism 50, allowing platen tiles 10 to be aligned precisely by sliding to form platen ensembles such as those depicted in FIG. 13. With this arrangement, planar motors 12 are in operative juxtaposition with lower surfaces 26 of platen tiles 10.

Figure 17:
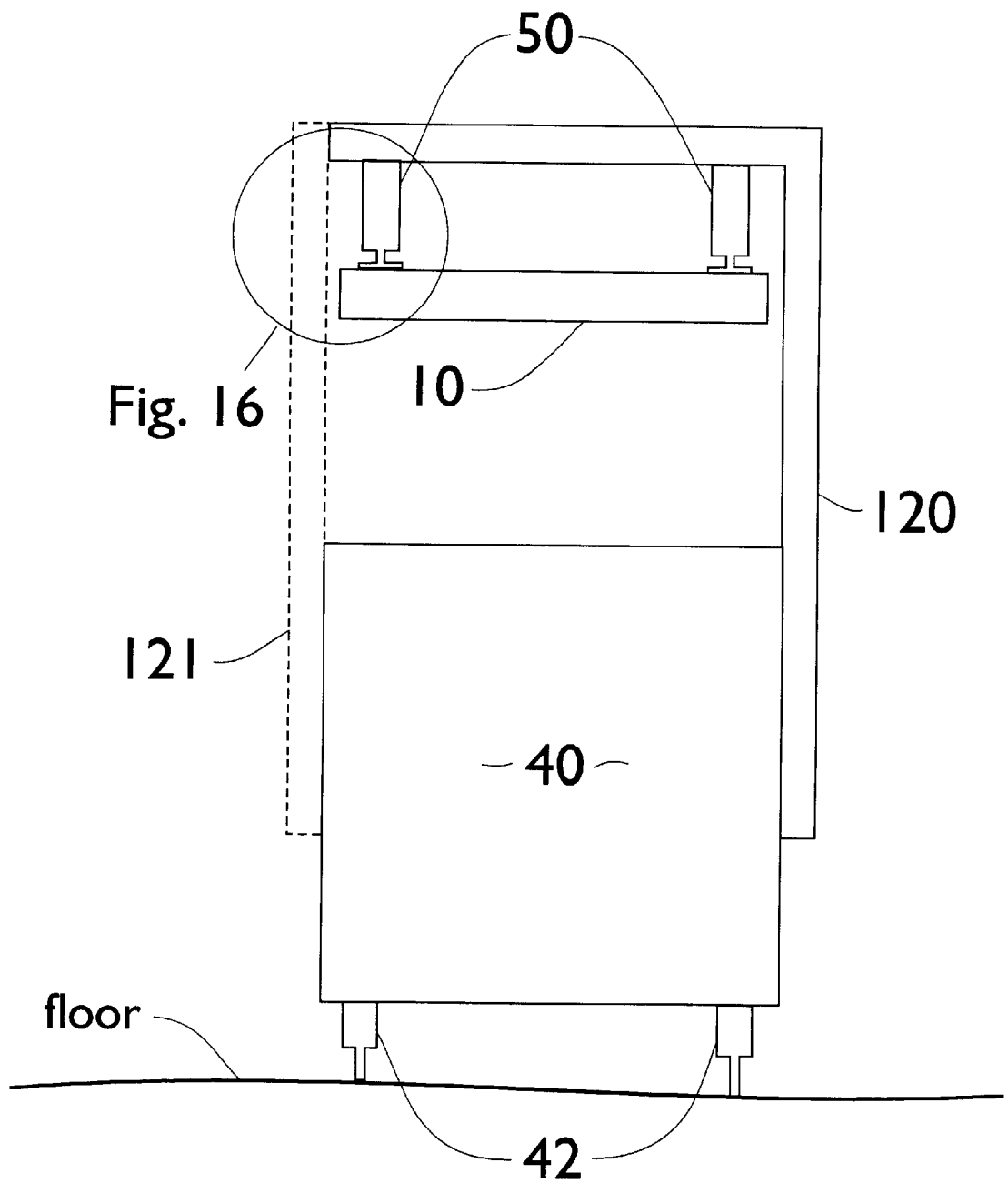
FIG. 17 shows a field-joinable platen tile suspended over the floor by a support base and structural frame.

An array of field-joinable platen tiles 10 may be suspended in the inverted configuration by the provisions depicted in FIG. 17. Here, field-joinable platen tile 10 is suspended from at least three (two are shown) precision height adjustment mechanisms 50 attached to structural frame 120 rigidly affixed to support base 40 providing support at a convenient height above the floor. Support base 40 has itself at least three coarse height adjustment mechanisms 42. Structural frame 120 may attach to only one side of support base 40 as shown in FIG. 17, providing easy access for human operators from the opposite side, or may form an arch over support base 40 attaching to both sides of support base 40 as shown by feature 121 (dashed lines) to provide increased structural rigidity.

It will be recognized that many different platen tiles such as those illustrated by FIGS. 3, 14, and 15 can all function in the upward-facing configuration shown in FIG. 4, or in the downward-facing configuration shown in FIG. 17.

The present invention may, of course, be implemented in very many other specific ways than those herein set forth without departing from the spirit and essential teachings of such invention. The present embodiments are, therefore, to be considered in all respects as illustrative and not restrictive. Having thus described the invention, what is claimed as new and what is desired to be secured by Letters Patent is:

1. A stator for planar motors comprising:
    (a) at least two temporarily conjoined rectangular platen tiles, each a stator having substantial rigidity and substantial planarity comprising operative surface means providing reactive forces for at least one planar motor in operative juxtaposition thereon;
    (b) said operative surface means having one or more operative feature means arranged in an array precisely aligned with respect to the edges of said platen tiles and providing electromagnetic interaction with opposing elements of said planar motor;
    c) said platen tiles having dimension $n\lambda \times m\lambda$ where n and m are positive integers, said array having periodicity $\lambda$, thereby permitting unbroken continuity of said operative feature means when at least two said platen tiles are temporarily conjoined;
    (d) in combination, said platen tiles and mechanical attachment means ensuring substantial co-planarity of said operative surface means of said platen tiles and substantially precise alignment of said edges of said platen tiles, said mechanical attachment means operable in reverse to unattach said platen tiles;
    whereby a contiguous ensemble of said platen tiles forms a single continuous said operative surface means of said stator for at least one said planar motor.

2. The stator according to claim 1, said operative feature means said array having periodicity $\lambda$, said edges located precisely $\lambda/2$ from the first row of said operative feature means and precisely $\lambda/2$ from the last row of said operative feature means, and othogonal said edges located precisely $\lambda/2$ from the first column of said operative feature means and precisely $\lambda/2$ from the last column of said operative feature means, thereby permitting unbroken continuity of said operative feature means when at least two said platen tiles are temporarily conjoined at any of said edges.

3. The stator according to claim 1, wherein said operative feature means comprise toothed ferromagnetic structures arranged in said array surrounded by non-magnetic material.

4. The stator according to claim 1, wherein said operative feature means comprise permanent magnets arranged in said array with alternating north- and south-pointing poles.

5. The stator according to claim 1, wherein said operative feature means comprise electrical coils arranged in said array.

6. The stator according to claim 1 wherein soft, removable non-magnetic polymer filler bridges unavoid-able small gaps in the interface crack between conjoined said platen tiles.

7. The stator according to claim 1, wherein soft, removable magnetic polymer filler bridges unavoid-able small gaps in the interface crack between conjoined said platen tiles.

8. The stator according to claim 1, wherein said operative surface means of said platen tiles face upward, thereby allowing at least one said planar motor to operate above said operative surface means.

9. The stator according to claim 1, wherein said operative surface means of said platen tiles face downward, thereby allowing at least one said planar motor to operate below said operative surface means.

10. A stator for planar motors comprising:
   (a) at least two temporarily conjoined rectangular platen tiles, each a stator having substantial rigidity and substantial planarity comprising operative surface means providing reactive forces for at least one planar motor in operative juxtaposition thereon;
   (b) said operative surface means having one or more operative feature means arranged in an array precisely aligned with respect to the edges of said platen tiles and providing electromagnetic interaction with opposing elements of said planar motor;
   (c) said platen tiles having dimension $n\lambda \times m\lambda$ where n and m are positive integers, said array having periodicity $\lambda$, thereby permitting unbroken continuity of said operative feature means when at least two said platen tiles are temporarily conjoined;
   (d) said platen tiles incorporating surrounding structural frame means therein of substantial strength for withstanding large clamping loads without appreciable deflection of said platen tiles' said operative surface means;
   (e) in combination, said platen tiles and at least three precision height adjustment means in contact with said platen tiles for setting the height and levelness of said platen tiles with substantial precision;
   (f) in combination, said platen tiles and at least two clamping means providing said large clamping loads each comprising first precision reference surfaces in intimate contact with each of said operative surface means of two conjoining said platen tiles, thereby ensuring that said operative surface means of both said platen tiles lie substantially within the same plane regardless of the thickness of the two said platen tiles; and each of said clamping means comprising second precision reference surfaces in intimate contact with said edges of two conjoined said platen tiles, thereby ensuring said operative surface means be aligned within said plane with substantial accuracy;
   whereby a contiguous ensemble of said platen tiles forms a single continuous said operative surface means said stator for at least one said planar motor.

11. The stator according to claim 10, wherein said precision height adjustment means comprise screws of differing pitches acting differentially in combination, whereby micrometer-level height adjustment is afforded.

12. The stator according to claim 10, wherein at least one clamping means providing said large clamping loads comprises a first precision reference surface in intimate contact with each of said operative surface means of three conjoining said platen tiles, thereby ensuring that said operative surface means of all three said platen tiles lie within the same plane regardless of the thickness of the three said platen tiles; and comprising second and third precision reference surfaces in intimate contact with said edges of two of the three said platen tiles conjoined at a common corner, thereby ensuring said operative surface means of all three said platen tiles be accurately aligned within said plane.

13. The stator according to claim 10, wherein said clamping means incorporate a flexure means affixed to said first precision reference surface for applying a substantially uniform distribution of said large clamping loads to said operative surfaces of conjoined said platen tiles.

14. The stator according to claim 10, wherein said clamping means incorporate a hinge means affixed to said first precision reference surface for applying a substantially uniform distribution of said large clamping loads to said operative surfaces of conjoined said platen tiles.

* * * * *